United States Patent
Barraclough et al.

(10) Patent No.: US 9,971,743 B2
(45) Date of Patent: *May 15, 2018

(54) CONTENT GENERATION AND TRANSMISSION WITH USER-DIRECTED RESTRUCTURING

(71) Applicant: Next Issue Media, Menlo Park, CA (US)

(72) Inventors: Keith Barraclough, Mountain View, CA (US); David Irvine, San Jose, CA (US); John Logan, Long Beach, CA (US)

(73) Assignee: Next Issue Media, Menlo Park, CA (US)

(*) Notice: Subject to any disclaimer, the term of this patent is extended or adjusted under 35 U.S.C. 154(b) by 303 days.

This patent is subject to a terminal disclaimer.

(21) Appl. No.: 15/051,341

(22) Filed: Feb. 23, 2016

(65) Prior Publication Data

US 2016/0179762 A1 Jun. 23, 2016

Related U.S. Application Data

(63) Continuation of application No. PCT/US2015/066849, filed on Dec. 18, 2015, and a
(Continued)

(51) Int. Cl.
*G06F 17/21* (2006.01)
*G06F 17/22* (2006.01)
(Continued)

(52) U.S. Cl.
CPC ........ *G06F 17/212* (2013.01); *G06F 17/2235* (2013.01); *G06F 17/2288* (2013.01);
(Continued)

(58) Field of Classification Search
None
See application file for complete search history.

(56) References Cited

U.S. PATENT DOCUMENTS

| 6,029,182 A * | 2/2000 | Nehab | G06F 17/30867 |
| | | | 707/E17.109 |
| 6,199,082 B1 * | 3/2001 | Ferrel | G06F 17/3089 |
| | | | 707/E17.005 |

(Continued)

FOREIGN PATENT DOCUMENTS

| EP | 1139253 A1 | 4/2001 |
| WO | 2008097624 | 10/2008 |
| WO | 2012158951 A1 | 11/2012 |

OTHER PUBLICATIONS

Kon et al., "A New Digital Future for Publishers?", Oliver Wyman, Media Entertainment and Leisure, www.oliverwyman.com. Aug. 2010.

(Continued)

*Primary Examiner* — Asher D Kells
(74) *Attorney, Agent, or Firm* — Crawford Maunu PLLC

(57) ABSTRACT

As may be implemented in accordance with one or more embodiments, media content from disparate content providers is restructured into one or more renditions having an article-oriented structure. Linking data is generated to link respective portions of each rendition with media content in the respective sets of media content. Users are allowed to access information characterizing the renditions in the article-oriented structure, and user inputs pertaining to the information characterizing the media content sets is collected. Portions of each rendition are transmitted to remote users based on the user inputs, authorization data, linking data and characteristics of the remote users' access.

20 Claims, 17 Drawing Sheets

Related U.S. Application Data continuation-in-part of application No. 14/681,911, filed on Apr. 8, 2015, said application No. PCT/US2015/066849 is a continuation-in-part of application No. 14/632,245, filed on Feb. 26, 2015, said application No. 14/681,911 is a continuation-in-part of application No. 14/632,245, filed on Feb. 26, 2015, which is a continuation of application No. 13/474,432, filed on May 17, 2012, now Pat. No. 8,977,964.

(60) Provisional application No. 62/248,938, filed on Oct. 30, 2015, provisional application No. 62/093,624, filed on Dec. 18, 2014, provisional application No. 61/976,939, filed on Apr. 8, 2014.

(51) Int. Cl.

| | | |
|---|---|---|
| *H04L 29/08* | (2006.01) | |
| *G06Q 30/02* | (2012.01) | |
| *G07F 17/20* | (2006.01) | |
| *G06Q 30/04* | (2012.01) | |
| *G06Q 30/06* | (2012.01) | |
| *G06F 21/10* | (2013.01) | |

(52) U.S. Cl.
CPC ......... *G06F 21/10* (2013.01); *G06Q 30/0258* (2013.01); *G06Q 30/04* (2013.01); *G06Q 30/0641* (2013.01); *G07F 17/20* (2013.01); *H04L 67/306* (2013.01); *G06F 2221/0731* (2013.01)

(56) References Cited

U.S. PATENT DOCUMENTS

| | | | |
|---|---|---|---|
| 6,397,231 B1* | 5/2002 | Salisbury | G06F 17/3089 |
| | | | 707/999.102 |
| 6,574,629 B1 | 6/2003 | Cooke et al. | |
| 7,076,534 B1* | 7/2006 | Cleron | G06F 17/30867 |
| | | | 707/E17.109 |
| 7,107,549 B2 | 9/2006 | Deaton et al. | |
| 7,827,180 B2* | 11/2010 | Achilles | G06F 17/2211 |
| | | | 707/741 |
| 7,908,358 B1 | 3/2011 | Prasad et al. | |
| 8,209,600 B1* | 6/2012 | Koh | G06F 17/2264 |
| | | | 715/244 |
| 8,397,161 B1* | 3/2013 | Shah | G06F 17/218 |
| | | | 715/234 |
| 8,977,964 B2 | 3/2015 | Barraclough et al. | |
| 8,978,149 B2 | 3/2015 | Barraclough et al. | |
| 2002/0035697 A1* | 3/2002 | McCurdy | G06F 17/30011 |
| | | | 726/3 |
| 2002/0091739 A1 | 7/2002 | Ferlitsch et al. | |
| 2004/0003097 A1* | 1/2004 | Willis | G06F 17/30867 |
| | | | 709/228 |
| 2004/0003351 A1 | 1/2004 | Sommerer et al. | |
| 2004/0054627 A1* | 3/2004 | Rutledge | G06Q 10/087 |
| | | | 705/50 |
| 2004/0199527 A1 | 10/2004 | Morain et al. | |
| 2005/0210412 A1 | 9/2005 | Matthews et al. | |
| 2006/0048043 A1 | 3/2006 | Kikuchi | |
| 2006/0106874 A1* | 5/2006 | Victor | |
| 2006/0136449 A1 | 6/2006 | Parker et al. | |
| 2006/0294051 A1 | 12/2006 | Kapadia et al. | |
| 2006/0294578 A1 | 12/2006 | Burke et al. | |
| 2007/0070442 A1 | 3/2007 | Ohkubo | |
| 2008/0109306 A1 | 5/2008 | Maigret et al. | |
| 2008/0195661 A1 | 8/2008 | Watson et al. | |
| 2009/0024698 A1* | 1/2009 | Ho | G06F 17/30905 |
| | | | 709/203 |
| 2009/0030792 A1 | 1/2009 | Khivesara et al. | |
| 2009/0138357 A1 | 5/2009 | Riggs | |
| 2009/0216623 A1 | 8/2009 | Hendricks et al. | |
| 2009/0249217 A1 | 10/2009 | Narayanaswami | |
| 2009/0259971 A1 | 10/2009 | Rankins et al. | |
| 2009/0319925 A1 | 12/2009 | Katinsky et al. | |
| 2010/0094878 A1 | 4/2010 | Soroca et al. | |
| 2010/0095337 A1 | 4/2010 | Dua | |
| 2010/0106702 A1* | 4/2010 | Strumpf | G06F 17/30286 |
| | | | 707/706 |
| 2010/0146146 A1 | 6/2010 | Welts et al. | |
| 2010/0175090 A1 | 7/2010 | Cordray | |
| 2010/0325086 A1 | 12/2010 | Skinner et al. | |
| 2011/0072078 A1 | 3/2011 | Chai et al. | |
| 2011/0080843 A1 | 4/2011 | Casey et al. | |
| 2011/0099071 A1 | 4/2011 | Johnson | |
| 2011/0169860 A1 | 7/2011 | Ito | |
| 2011/0296291 A1* | 12/2011 | Melkinov | G06F 17/211 |
| | | | 715/229 |
| 2012/0147055 A1 | 6/2012 | Pallakoff et al. | |
| 2012/0210207 A1 | 8/2012 | Boss et al. | |
| 2012/0297302 A1 | 11/2012 | Barraclough et al. | |
| 2013/0081083 A1 | 3/2013 | Yu et al. | |
| 2013/0198602 A1 | 8/2013 | Kokemohr | |
| 2014/0337322 A1 | 11/2014 | Cho et al. | |
| 2014/0365851 A1* | 12/2014 | Kroupa | G06F 17/2229 |
| | | | 715/205 |

OTHER PUBLICATIONS

Chorianopoulos et al. "Cross Media Digital Rights Management for Online Stores" [online]. In: Proceedings of the First Int'l Conference on Automated Production of Cross Media Content for Multi-Channel Distribution 2005.

Sathish. "Delivery Context Access for the Mobile Web" [online]. Dated May 2007. Retrieved at: http://tutkielmat.uta.fi/pdf/lisuri00064.pdf.

Supplementary European Search Report for Application No. EP 12785780, dated Mar. 2, 2015.

"Cloud Mobile Media: Reflections and Outlook", Wen et al., IEEE Transactions on Multimedia, vol. 16, No. 4, pp. 885-902, Jun. 2014.

EPO Extended Search Report, counterpart European Patent Application No. 137577045 (Oct. 16, 2015), 2 pgs.

Story, G. A. et al, "The Right Pages Image-Based Electronic Library for Alerting and Browsing," Computer, IEEE, vol. 25, No. 9 (Sep. 1992), pp. 17-25.

International Search Report, counterpart PCT Application No. PCT/US2015/066849 (dated Feb. 5, 2016).

\* cited by examiner

CONTENT GENERATION AND TRANSMISSION WITH USER-DIRECTED RESTRUCTURING

FIELD

Various embodiments are directed to content rendition generation and transmission, with end-user based control.

BACKGROUND

Various devices such as computers, tablets and hand-held devices such as mobile telephones are used at a rapidly increasing pace to access media. For instance, users may access news articles or other stories from a variety of sources.

While access to media has been useful, various aspects remain challenging. For example, article metadata may not be available prior to a publication date for content. In addition, it may be difficult to provide access to disparate types of media content on certain devices, or in a flowing and pleasing format. Often, these issues can hinder the provision of media content, may increase cost for doing so, and otherwise render content access difficult for a variety of uses. These and other matters have presented challenges to content access, for a variety of applications.

SUMMARY

Various example embodiments are directed to methods and apparatuses involving the generation and implementation of renditions of media content.

In accordance with one or more embodiments, portions of media content data, which correspond to respective sets of media content received from disparate content providers, is restructured into at least one restructured rendition having an article-oriented structure. Device-indeterminate ID linking data is generated, and links respective portions of each rendition with media content in the respective sets of media content. User access is provided to information characterizing the renditions in the article-oriented structure, and user inputs pertaining to the information characterizing the media content sets are collected. Respective portions of each rendition are transmitted to users at remote user interface circuits based on (for each user): the collected user inputs, media content access authorization data for the user, the device-indeterminate ID linking data, and characteristics of the remote user interface circuit via which the user accesses the media content. In various contexts, transmitting the respective portions of the rendition includes identifying the respective portions of restructured media content based upon selection inputs provided by the user, combining the identified respective portions into a new rendition, and transmitting the new rendition to the user.

In accordance with more particular embodiments, media content data is reformatted and restructured as follows. Different types of media content data, having disparate formats and corresponding to respective sets of media content received from disparate content providers, is reformatted into a common format type. Portions of the media content data in the common format type are restructured into restructured renditions having an article-oriented structure defined by the common format type. For each rendition, respective reformatted assets are generated based upon characteristics of a plurality of disparate device types, with each reformatted asset being specific to one of a plurality of disparate types of devices. Device-indeterminate ID linking data is generated, and links respective portions of each rendition with portions of the media content data having disparate formats.

Another embodiment is directed to an apparatus having a first formatting circuit that formats different types of media content data having disparate formats and corresponding to respective sets of media content received from disparate content providers, into media content data in a common format type. A second restructuring circuit restructures portions of the media content data in the common format type into restructured renditions having an article-oriented structure defined by the common format type. A third asset generator circuit generates, for each rendition, respective reformatted assets in which each reformatted asset is specific to one of a plurality of disparate types of devices, based upon characteristics of the disparate device types. A linking circuit generates device-indeterminate ID linking data that links respective portions of each rendition with portions of the media content data having disparate formats.

In some embodiments, a tracking circuit tracks access to the restructured renditions, and a digital magazine generator circuit uses the tracked access to identify new portions of media content from different ones of the respective sets of media content data. Ones of the renditions corresponding to the identified new portions of media content are combined into a combined data set providing a digital magazine, which is presented to a user via a remote user interface circuit (e.g., a mobile phone or tablet) accessed by the user.

In accordance with one or more embodiments, a method and/or apparatus involves different types of media content data having disparate formats and corresponding to respective media content issues received from disparate content providers. The media content data is formatted into a common format type based upon formatting criteria defined for each of the disparate content providers. Respective portions of the media content data, provided by different ones of the content providers, are transmitted in the common format type to users at remote user interface circuits. This transmission is based on, for each user, transmission initiation data from the user interface circuit, media content access authorization data for the user and characteristics of the remote user interface circuit via which the user accesses the media content. For instance, explicit user requests, historical user access or group-type access of other users in a group to which a particular user is assigned can be used to formulate transmission initiation data. Such information can be transmitted from a reader application at the user interface circuit. The transmission initiation data identifies the portions of the media content issues and is initiated in response to user-inputs requesting viewing of the portions of the media content issues at the user interface circuit. Access to the transmitted portions of the media content data is tracked and new portions of media content are identified from different ones of the respective issues based on the tracking, the media content authorization data and characteristics of the remote user interface circuit. The new portions of media content may include, for example, articles that a user has not yet read and that are otherwise related to one or more types of content that the user accesses (as identified via the tracking). This tracking may involve, for example, tracking access by a specific user, or other users in a group or other users with similar interests (e.g., as identified via profile type matching data). Media content data in the common format corresponding to the identified new portions of media content are combined into a data set providing a virtual media content issue. The combined data set is transmitted to the user via the remote user interface circuit accessed by the user.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

Figure 1A:
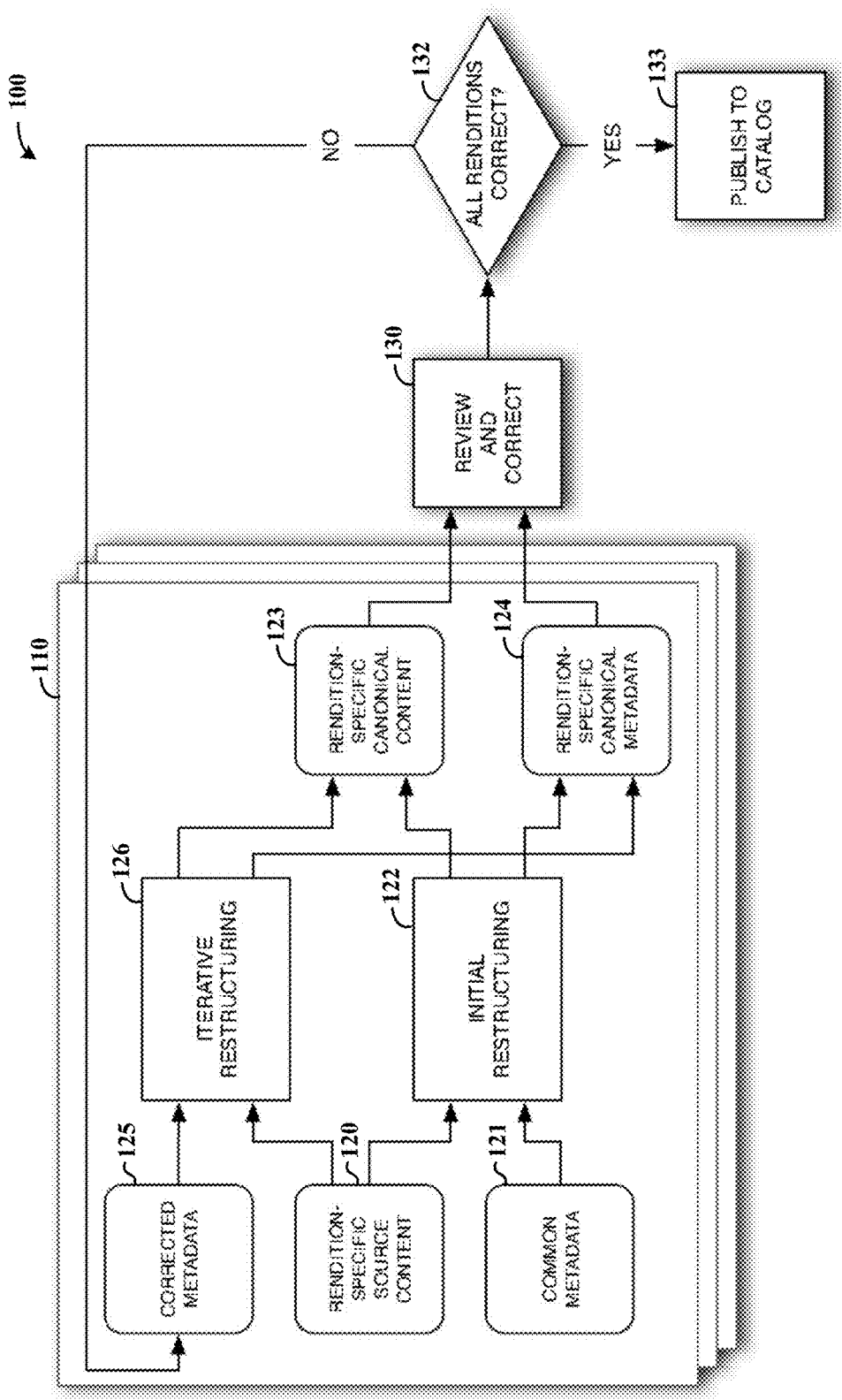
FIG. 1A shows a high-level overview of an apparatus and/or method, as may be applicable to one or more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving media content and related circuits. Various embodiments involve reformatting media content having disparate formats, providing a common format from which renditions can be subsequently generated. Such an approach may, for example, involve formatting digital magazine issues from different content providers into a common format, and restructuring the common-format data into renditions that can be used to construct a new digital magazine having content from one or more of the content providers. These approaches are useful for interacting with disparate types of devices, disparate content sources and disparate end users, and addresses challenges relating to such interaction and processing of disparately-formatted data for a large number of users. Further, these approaches can be implemented for generating new digital magazine issues from disparately-formatted digital magazine issues provided by publishers, and can be done in a manner that is tailored to a multitude of specific users. This can be implemented, for example, by generating new magazine issues tailored to individual users, with each issue having content sourced from different source issues and/or different publishers. While not necessarily so limited, various aspects may be appreciated through a discussion of examples using this context.

Various embodiments are directed to customizing magazines based on subscriber/end-user access requests and on verification of a content-joined data library, and related aspects providing services to subscribers and subscriber devices. In accordance with a particular embodiment, different types of media content data, having disparate formats and corresponding to respective sets of media content received from disparate content providers, are formatted into media content data in a common format type. Portions of the media content data in the common format type are restructured, therein forming restructured renditions having an article-oriented structure defined by the common format type. For each rendition, respective reformatted assets are generated in which each reformatted asset is specific to one of a plurality of disparate types of devices, based upon characteristics of the disparate device types. Device-indeterminate ID linking data is generated and links respective portions of each rendition with portions of the media content data having disparate formats. For each of a plurality of users, access is provided to information characterizing the renditions in the article-oriented structure, and user inputs pertaining to the information characterizing the renditions are collected. Respective portions of the restructured renditions are transmitted, along with assets corresponding to the respective portion being transmitted, to users at remote user interface circuits based on, for each user, the collected user inputs, media content access authorization data for the user, the device-indeterminate ID linking data, and characteristics of the remote user interface circuit via which the user accesses the media content. Various implementations involve such sets of media content including electronic magazine issues from different electronic magazine publishers. The restructured renditions can thus be arranged in an article-oriented structure for an electronic magazine including sets of media content from different ones of the electronic magazine issues.

In some implementations, the media content in the common format type is stored, and for each subscriber, subscriber-specific content library data is generated as data that links one or more sets of the stored media content to the subscriber. Each subscriber is notified of content in the subscriber-specific content library by providing information indicative of the content to the subscriber. In some implementations, subscriber-relevant information is sent to the subscriber in response to the notification. This subscriber-relevant information may include information that is not identified by the subscriber-specific content library data, such as offers, advertisements, promotions, and sample-previews.

In some embodiments, access information is communicated with the subscriber, the access information pertaining to services, goods or additional content that is available to the subscriber (e.g., but not included in the subscriber-specific library). The access information includes information for providing the services, goods or additional content to the subscriber. In various contexts, the transmitted portions of the restructured renditions pertain to such services, goods or additional content.

In other embodiments, access is provided to a set of the stored media content corresponding to the content based on the subscriber-specific content library data. This can be carried out in response to the notifying/notification, such as in response to a subscriber requesting the access by selecting or responding to the notification. In some implementations, the portions of media content data (representing different ones of the electronic magazine issues in the common format) are restructured into a virtual magazine issue. This restructuring is carried out based on the user inputs (e.g., keywords, subject areas, and/or dates) collected for one or more of the users, and the virtual magazine is transmitted. With this approach, one or more users can be provided with a user-specific virtual magazine characterized by the inputs provided by the at least one of the users.

In some embodiments, the media content is restructured into an additional rendition based on user inputs collected for one or more of the users, and the additional rendition is transmitted to the user providing the inputs. Using this approach, the user can provide direct inputs characterizing the generation of the rendition (e.g., a virtual magazine).

The restructured renditions (or portions thereof) are transmitted as follows. One of the respective portions of a rendition is selected based on the collected user inputs, media content access authorization data, device-indeterminate ID linking data and characteristics of the remote user interface circuit. Another one of the respective portions is then selected based on the selected first one of the respective portions. This may involve, for example, identifying an article or portion of an article based upon user inputs, and then linking that identified article/portion to an additional portion of a rendition. The additional data may, for example, include additional article content, advertising, offers or other content. The identified and additional portions are then both transmitted to the user.

Access can be provided to the information characterizing the renditions by identifying the renditions based on at least one of the collected user inputs, media content access authorization data, device-indeterminate ID linking data and characteristics of the remote user interface circuit. In some implementations, information characterizing user access conditions for the identified renditions is generated in response to the user inputs. If a user satisfies the user access conditions (e.g., subscribes to a magazine, provides funding for purchase, or carries out another action), respective portions of the restructured renditions corresponding to the identified renditions are transmitted. The information characterizing user access conditions may include, for example, offers, advertisements, promotions, and sample-previews.

In some embodiments, portions of restructured renditions are identified for one or more users based on other users access. For instance, a particular user may provide user inputs identifying other users upon which to base rendition generation and/or transmission. User inputs for such other users are collected, and include historical access to portions of the renditions. Respective portions of the restructured renditions are then identified based on the historical access by the other users that the particular user identifies. In this context, the particular user may be provided with restructured renditions corresponding to renditions accessed by one or more other identified users. For instance, if a user is keen to participate in group discussions, that user can select participants in the group and, based on that selection, renditions are generated and/or provided to the user in accordance with the actions of the selected group participants.

A variety of apparatuses can be implemented to carry out functions as characterized herein. For instance, respective circuits may be used, together or separate, and with various types of circuitry therein relating to communication ports, conductors and processing circuits. In one such embodiment, a first circuit formats different types of media content data having disparate formats and corresponding to respective sets of media content received from disparate content providers, into media content data in a common format type. A second circuit restructures portions of the media content data in the common format type into restructured renditions having an article-oriented structure defined by the common format type. A third circuit generates, for each set of media content, respective reformatted assets in which each reformatted asset is specific to one of a plurality of disparate types of devices, based upon characteristics of the disparate device types. A fourth circuit generates device-indeterminate ID linking data that links respective portions of each rendition with portions of the media content data having disparate formats. A fifth circuit provides, for each of a plurality of users, access to information characterizing the renditions in the article-oriented structure, and collects user inputs pertaining to the information characterizing the renditions. A sixth circuit transmits respective portions of the restructured renditions along with assets corresponding to the respective portion being transmitted, to users at remote user interface circuits based on (for each user): the collected user inputs, media content access authorization data for the user, the device-indeterminate ID linking data, and characteristics of the remote user interface circuit via which the user accesses the media content.

Circuits as characterized in the previous paragraph above may include a plurality of communication ports connected by circuitry to one or more computer processors programmed to execute instructions that carry out the indicated operations upon data received on one or more of the communication ports and/or upon data transmitted on one or more of the communication ports. For instance, referring to FIG. 1C, the first circuit may be implemented with the formatting circuit module 140, and the second circuit may be implemented with restructuring circuit/module 150. The asset generator 160 may be implemented with the third circuit, and the fifth circuit may be implemented with the ID generation/linking module 170. The content server 190 may implement the sixth circuit, as well as other circuits and functionality in providing information to one or more subscribers at the remote devices, publishers providing the publisher content, or other users authorized accordingly.

In accordance with more particular embodiments, media content data such as digital magazine data is reformatted and restructured as follows. Different types of media content data having disparate formats are received from disparate content providers, in which the content corresponds to respective sets of media content. The media content data is reformatted into a common format type, such that all of the content received from the disparate content providers can be provided in a common format and, for example, stored for later access. Portions of the reformatted media content data are restructured to provide restructured renditions with an article-oriented structure defined by the common format type. This may involve, for example, generating article structure for content not having such structure, or generating article structure for the reformatted media content based on an article structure in the received sets of media content. This approach may also involve, for example, generating a single rendition or multiple renditions from one or more sets of media content received from a content provider.

For each restructured rendition, reformatted assets are generated based upon characteristics of a plurality of disparate device types, with each reformatted asset being specific to one of a plurality of disparate types of devices. These assets are portions of media content, and may include, for example, text, images, video, audio, or advertising material. Device-indeterminate ID linking data is generated, which links respective portions of each rendition with portions of the media content data having disparate formats (e.g., including data that can be used to identify the respective portions by storage location or other identification). The device-indeterminate ID linking data may, for example, link digital media content including at least one of articles, images, text and rich media content displayed on a user device, independent from the type of device upon which the at least one of images and text is displayed and independent from a page upon which the digital media content is displayed.

The linking data can be used in a variety of manners, to suit particular embodiments. For example, the linking data can be used to link user access back to original content, publishers, groups or other aspects of the original content. As such, portions of content can be linked to articles defined in metadata, transitively linking articles across all renditions produced for a magazine issue (e.g., including instances in which publisher/input renditions have no article linking data). The linking data can further ensure secure access to the restructured renditions, based on security or other authorization conditions tied to the original content. Moreover, access to the restructured renditions can be tracked and the linking data can be used to correlate the tracking to the original content. This tracking can be subsequently used in providing analytics and/or in generating one or more of renditions and new digital magazine issues. The linking data may also be used to link at least one of assets and a structural component of the media content that includes the assets. In some implementations, the linking data identifies digital media content including at least one of articles, images, text and rich media content displayed on a user device, independent from the type of device upon which the at least one of images and text is displayed and independent from a page upon which the digital media content is displayed.

Restructuring can be carried out in a variety of manners, and to suit a variety of needs. For instance, where each of respective sets of media content represents an original digital magazine issue received from one of the disparate content providers, the media content data can be restructured into respective reformatted digital magazine issues having content that mimics content in one or more of the original digital magazine issues. In some embodiments, both navigational data and page layout data for displaying text and/or images are generated for each rendition as part of restructuring. The linking data is then generated as data that links each page in each rendition to at least one article or page in one or more of the sets of media content from which the rendition was generated. In certain embodiments, an article-oriented structure is generated with a visual layout that corresponds to a visual layout of the respective sets of media content.

In various embodiments, restructuring includes accessing a library of the media content data in the common format type, and generating respective issues of electronic magazines from the media content data, based on the linking data and structuring information provided by one or more of the content providers that provide the accessed library of the media content data. This may involve, for example, generating respective virtual issues of electronic magazines from the media content data, based further upon data characterizing one or more users to which access to the virtual issues is provided. This data characterizing one or more users may be specific to a particular user or to a genre of users. In some implementations, this library-based approach involves a library including media content data for different issues of a common digital magazine to which the user has access, with a customized electronic magazine being generated from the library of media content data. Accordingly, such virtual issues may be generated using guidelines and/or instructions as may pertain to one or more of automated analysis or curation directed by a user, publisher and/or distributor.

Various embodiments further involve generating metadata for the media content data in the common format type, the metadata including information that characterizes the media content data as pertaining to a particular article within a digital magazine. This approach can be implemented by breaking articles in a digital magazine issue into subsets of content in each issue, with the subsets of content having the media content data in the common format type. Content boundaries are defined within the articles and portions of the media content data are restructured based on the boundaries. For instance, certain aspects of an article as pertaining to a particular image or set of images and text content may be designed for display on a common page, and can be restructured as such.

Various embodiments involve tracking user access to content and using that tracking in a variety of manners. In some embodiments, new portions of media content are identified from different ones of the respective sets of media content data based on tracked user accesses to respective articles in the restructured renditions. This identifying may, for example, include tracking access to the renditions by remote user devices. At least two articles of the media content data in the common format type are combined into a virtual magazine issue as part of the restructuring.

In certain embodiments respective portions of the restructured renditions are transmitted along with assets corresponding to the respective portion being transmitted, to users at remote user interface circuits. The transmission is based on, for each user, media content access authorization data for the user, the device-indeterminate ID linking data, and characteristics of the remote user interface circuit via which the user accesses the media content. Access to the restructured renditions can also be tracked in this context, and new portions of the restructured renditions can be identified from different ones of the respective sets of media content based on the tracking, the media content access authorization data and characteristics of the remote user interface circuit. Restructured renditions corresponding to the identified portions of the restructured renditions are combined into a data set providing a digital magazine, which is presented to a user via the remote user interface circuit. Transmitting the restructured renditions in this context may be carried out based on transmission initiation data received from the remote user interface circuit, which identifies the portions of the media content sets. This initiation data may, for example, be initiated in response to user-inputs requesting viewing of portions of media content sets, or automatically initiated by a device based upon user settings.

Various embodiments involve reformatting respective sets of media content representing digital magazine issues received from the disparate content providers, into a common (e.g., canonical) format. The restructured renditions may be combined to effectively combine articles from different ones of the digital magazine issues into a virtual digital magazine issue.

Various embodiments are directed to reformatting disparate sets of original media content into reformatted media content having a common format, and restructuring the reformatted media content. This restructuring may, for example, involve constructing an electronic magazine type article from the reformatted media content, with layout derived from the original media content. In some implementations, a rendition is reformatted from a source format such as PDF (portable document format from Adobe), Adobe Folio, OFIP (Open Format for Internet Publications by Woodwing), an electronic book format such as ePub of the International Digital Publishing Forum, and HPUB (form the open source Baker Framework or Friar Framework) to a common canonical format. This approach can facilitate restructuring at a later time, using reader-type components that may operate to recognize/process a single content format. For instance, such a reader-type component may be programmed to process only the common canonical format, simplifying the componentry and facilitating reliability.

Restructuring may be carried out in a variety of manners. In some embodiments, content tools restructure a rendition by mapping a native document structure defined by the format of the original media content, to an article-oriented structure defined by the common canonical format. Each article in resulting output content represents a discrete unit of editorial content (e.g., as defined by the publisher of the original media content), and maps some subset of the reformatted media content to the original media content. In some implementations involving magazine content, subsets are determined by matching input content features with features from a set of article metadata records whose features are common to all renditions of a magazine issue. Restructuring content according to article metadata allows the construction of an article catalog upon which many features may rely, such as full-text search, recommendations, bookmarking, sharing, deep linking, and fine-grained reporting and analytics.

Accordingly, restructuring may involve accurately identifying content elements that constitute each article in a rendition of an issue, associating constituent article content with article metadata that is common to all renditions of the issue, and relating equivalent content articles from different renditions of an issue to one another via a globally unique rendition independent identification (e.g., a UUID) that is mathematically derived from a globally unique name determined by the common metadata. Article metadata, in this context, may be provided in an original set of content received from a publisher, or generated for content that has no metadata or as new metadata for content having metadata. Where content having metadata is received along with another version of that content not having metadata, the former content metadata can be used in defining metadata in the latter. In some implementations, content tools restructure source content to define articles, using a constraint that specifies that a degree (or all of) the presentation structure (visual layout) of original content shall be preserved.

A variety of components of media content can be restructured, involving some or all of a set of content. In various embodiments, input formats are used to define a specific presentational model to be applied to a resulting restructured document structure. The details of the presentational model may vary between formats. For example, a PDF document may have a linear sequence of pages, where each page is a discrete and individually addressable unit of information display. A page may be identified by a 1-based index that corresponds to its offset within the linear sequence. An Adobe Folio document may have a linear sequence of content stacks, each of which is a discrete and individually addressable unit of information display. A user can navigate the content stacks sequentially by horizontally scrolling between stacks. Each content stack includes one or more background assets (e.g., which may be laid out vertically or horizontally), over which may exist a variety of static and interactive overlays such as images, video, audio, and slideshows. A content stack can be identified by a text "localId" property that is unique.

One or more embodiments herein may be implemented in connection with one or more aspects shown and/or described in: U.S. patent application Ser. No. 13/474,432 (now U.S. Pat. No. 8,977,964); PCT Patent Application No. PCT/US2015/066849; PCT Patent Application No. PCT/US2012/038406; U.S. patent application Ser. No. 13/415,157 (now U.S. Pat. No. 8,978,149); and U.S. patent application Ser. No. 13/439,665 (now U.S. Pat. No. 9,274,694), all of which are fully incorporated herein by reference. For instance, various rendition-based aspects may be implemented with systems and approaches such as one or more of the apparatus(es) shown in FIGS. 1A-1D of U.S. patent application Ser. No. 13/474,432 (now U.S. Pat. No. 8,977,964) (e.g., with stored content in one or more renditions) and similar aspects of PCT Patent Application No. PCT/US2012/038406. In addition, various embodiments may be implemented with usage-based tracking and content provision as described in U.S. patent application Ser. No. 13/415,157 (now U.S. Pat. No. 8,978,149) (e.g., as in FIGS. 1A-1D). One or more embodiments may also be implemented in connection with content delivery and related presentation of available media (e.g., with creation and management of renditions of that content), such as described in U.S. patent application Ser. No. 13/439,665 (now U.S.

Pat. No. 9,274,694) (e.g., as shown in and described in connection with FIGS. 1 and 3).

One or more embodiments are directed to a system having a storefront, such as described in U.S. patent application Ser. No. 13/474,432 (now U.S. Pat. No. 8,977,964). The storefront may provide a website with catalog-type purchasing functions, such as may be amenable to a magazine rack. Users can select issues, or a library of issues, and the storefront may identify what issues a user can access as well as accounting aspects and related user entitlement. Various remote user devices can access the storefront, and a content delivery system provides content to the user devices based upon activity in the storefront (e.g., with content being stored in cloud storage with a content delivery network in front of it using an edge cache).

Various aspects are directed to bringing content into a content delivery network and system, and making content such as a magazine issue available in such a storefront catalog. An input file from a publisher for respective media content includes assets (e.g., media such as text, images and/or video) and metadata that attributes the assets to a page. This information is pushed to a content delivery network, and catalog-related information is pushed to a storefront catalog served by the content delivery network.

Media content received from disparate publishers is formatted into a common format for use and for rapid loading for media-rich content, such as magazine content having embedded video or audio. The common format is transformed into one or more renditions, each rendition including assets (e.g., set of content), which may be presented in two or more formats for each asset. For instance, each format may be device-specific and scaled based upon aspects of the device from which the content is requested for delivery and access (and, e.g., storing). In this context, a single data format/rendition can be used to generate respectively scaled versions of the content that are amenable to use on disparate devices with different requirements, which can be carried out on an asset-by-asset basis. For instance, a rendition can be generated with two or more different versions of respective assets therein, such that the rendition is amenable to access on disparate devices each utilizing a different one of the respective versions. Accordingly, a single rendition can support multiple display resolutions (such as a standard definition and a high-definition display) and image formats (e.g., raster and PDF). For instance, each rendition can be implemented on devices with different display resolutions, aspect ratios, and page layout and the size of the assets that are optimized for each device. Such an approach facilitates rapid load times, and desirable storage of relevant data. In certain embodiments, the common format includes information for loading on remote devices in an order based on which aspects are to be displayed first. In some embodiments, media content is stored with rendition-independent IDs, such that each rendition can be linked to a particular set of content that can be accessed on different devices.

In various contexts, the term rendition characterizes an input rendition provided by a publisher. Each input rendition is converted to a common-format output rendition that contains logical assets, each of which contains one or more physical assets which vary on scale and format. Publishers may provide multiple input renditions for an issue, in which case each input rendition can be processed individually (and, e.g., using common metadata for linking the article structures of each rendition).

In some embodiments, renditions are made for several target configurations known for particular devices, with the respective configuration stored in a matrix corresponding to a parent set of common format-data. This approach can be implemented, for example, by storing multiple physical assets in a matrix corresponding to logical assets. For instance, for certain high-definition devices, large-scale or high-definition assets corresponding to logical assets of media content may be sent through to end users. For devices operating at lower definition and accessing the same media content, small-scale or low-definition assets corresponding to the same logical assets can be sent to end users. These approaches may, for example, be carried out using a parser function to parse content and identify characteristics such as scaling to be performed based on a size and/or type of assets detected in the content, or other characteristics such as device type or communication connection type.

In addition to scaling as relating to resolution, the format of the respective assets in each rendition, or the format of the renditions themselves, may also be set for the respective devices on which each rendition is to be accessed. For instance, for media content pertaining to a set of assets, metadata that describes aspects of the content such as page layout of magazine-type content is configured with information that models the layout using the different assets. Such an approach can be carried out in various manners, such as by tailoring the resulting scaling and/or format of assets to access and display characteristics and, in some embodiments, characteristics of available delivery channels (e.g., quality of wireless connection via which the content is provided). For instance, some devices may be amenable to displaying certain resolutions of documents formatted in a PDF format available from Adobe, and related assets can be scaled accordingly relative to resolution. For the same target content, devices that do not support such a format may be served by generating another data format type, such as JPEG or PNG, at respective scaling.

Accordingly, different scaled versions of a particular asset, along with information for presentation of content (e.g., display of information, play audio or play video), can be targeted to specific devices. Each asset may contain a series of asset descriptors each of which is a physical asset that has an asset class. Such assets may, for example, be bundled or left unbundled for delivery, such as to group portions of a media content file or portions of different files. For instance, if a page has a video file, such as 10 megabytes, with other aspects in the page being 1-2 megabytes, such a video file can be unbundled from the rest of the page such that the rest of the page can be delivered and displayed first and quickly (e.g., in a single bundled archive that can be retrieved with a single request), with the video being presented later. In some implementations, a place holder or a poster image is displayed in place of the video file until it is delivered and/or until a user requests delivery.

Various embodiments involve circuit-based methods and/or apparatuses, as exemplified by examples herein, with methods and/or apparatuses being directed to, including and/or involving different types of media content data having disparate formats and corresponding to respective sets of media content received from disparate content providers, and efforts to develop therefrom a common format type. Portions of the media content data are sent to users at remote user interface circuits, using one or more of transmission initiation data that identifies the portions of the media content, media content access authorization data, and/or characteristics of the remote user interface circuit via which the user accesses the media content. For at least one user or entity that sends data indicating a request to access at least a subset of the portions of the media content data, media content data is combined in a common format, and at least some of the portions of the media content data are provided in a combined data set in response to the user or entity. The combined data set is presented to the user via the remote user interface circuit accessed by the user. Such an approach may involve generating a virtual electronic magazine issue, which has portions of two or many individual media content sources.

Various embodiments are directed to a method including, or an apparatus to perform, steps involving formatting different types of media content data having disparate formats and corresponding to respective sets of media content received from disparate content providers, into a common (e.g., canonical) format type. This approach may involve reformatting media content issues such as electronic magazine issues, received from disparate publishers. Respective portions of the media content data, as provided by different ones of the content providers, are transmitted in the common format type to users at remote user interface circuits. The transmission is based on, for each user, transmission initiation data from the user interface circuit, media content access authorization data for the user (e.g., subscription data), and characteristics of the remote user interface circuit via which the user accesses the media content. The transmission initiation data may, for example, identify portions of the media content sets requested by or accessed by the user interface circuit, and may be initiated in response to user-inputs requesting viewing of portions of media content sets or automatically by the user interface circuits or other circuitry. Access to the transmitted portions of the media content data is tracked and, for each user, new portions of media content from different ones of the respective issues are identified based on the tracking, the media content authorization data and characteristics of the remote user interface circuit. Media content data in the common format corresponding to the identified new portions of media content is combined into a combined data set, such as a virtual media content issue (e.g., virtual magazine issue). The combined data set is presented to the user via the remote user interface circuit (e.g., to a user's device, such as a smart phone, personal computer or tablet).

In various embodiments, sets of disparately-formatted media content are reformatted into corresponding renditions of media content having a common format by restructuring portions of the media content data in a common format type into an article-oriented structure defined by the common format type. Restructuring may include, for example, generating an article-oriented structure having a visual layout that corresponds to a visual layout of the respective disparately-formatted media content. The common format includes device-indeterminate ID linking data that links respective portions of each rendition with the common format to corresponding portions of the disparately-formatted media content. The respective portions may, in this context, include one of assets and a structural component of the media content that includes the assets. Reformatted assets are generated for each rendition, with each reformatted asset being specific to one of many disparate types of devices, and being reformatted based upon characteristics of the disparate device types. Access to the portions of disparately-formatted media content and assets therein is tracked based on the linking data.

One or more embodiments characterized herein may be implemented in connection with and/or otherwise using embodiments in U.S. Provisional Patent Application Ser. No. 62/248,938 entitled "Content Rendition Generation and Control," to which benefit is claimed and which is fully incorporated herein by reference. Similarly, one or more embodiments characterized herein may be implemented in connection with and/or otherwise using embodiments in U.S. patent application Ser. No. 14/681,911, entitled "Content Rendition Generation and Control," to which priority is also claimed and which is fully incorporated herein by reference. For instance, various embodiments characterized in similar figures in these referenced patent documents, and claims therein supported by those figures, can be implemented in accordance with embodiments herein.

Turning now to the figures, various embodiments are shown and described therein, and may be implemented with one or more embodiments herein. For instance, FIG. 1A shows a high-level overview of an apparatus and/or method 100, as may be applicable to one or more embodiments (e.g., with iterations 110 thereof implemented for different resulting publications). Rendition-specific source content 120 is initially restructured at block 122 using common metadata 121 to generate rendition-specific canonical content 123 along with rendition-specific canonical metadata 124. This approach may, for example, involve reformatting the rendition-specific source content 120 into the canonical format prior to restructuring. The rendition-specific canonical content 123 and related metadata 124 is reviewed at block 130 and, if appropriate, corrected. If all renditions are not correct at 132, the process continues using corrected metadata 125 to iteratively restructure the rendition-specific source content 120 at block 126 to generate rendition-specific canonical content 123 and related metadata 124 that is reviewed at block 130 and, if needed, corrected. Once all renditions are correct, the rendition-specific canonical content is published at block 133.

Figure 1B:
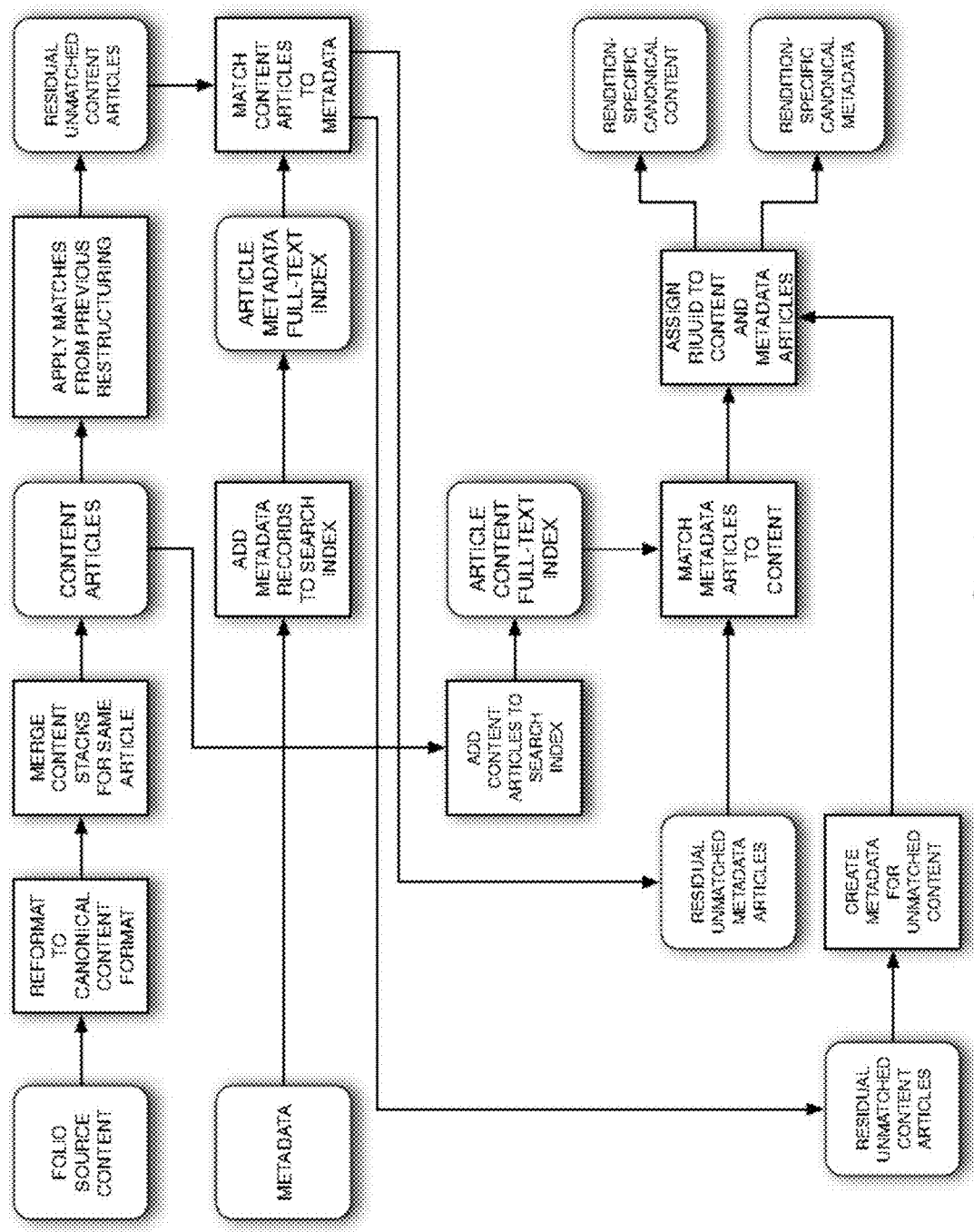
FIG. 1B shows a mid-level overview of an apparatus and/or method, as may be applicable to one or more embodiments.

FIG. 1B shows a mid-level overview of an apparatus and/or method, as may be applicable to one or more embodiments. Source content (such as Adobe Folio source content) is reformatted into a canonical content format, and used to form content articles. Where Adobe Folio content is reformatted, content stacks are merged for common articles. Previous restructuring matches (if any) are applied to match the canonical content to original/source content. Metadata is added to a search index and used to generate a full text index, which is used to match any residual unmatched content articles to original/source content.

The content articles are added to a search index and used to generate an article content full-text index, which is used to match residual unmatched metadata articles to content. Metadata is also created for unmatched content for residual unmatched content articles. An ID (RIUUID) is assigned to the residual unmatched content articles and metadata articles, and used to generate rendition-specific canonical content and related canonical metadata.

Figure 1C:
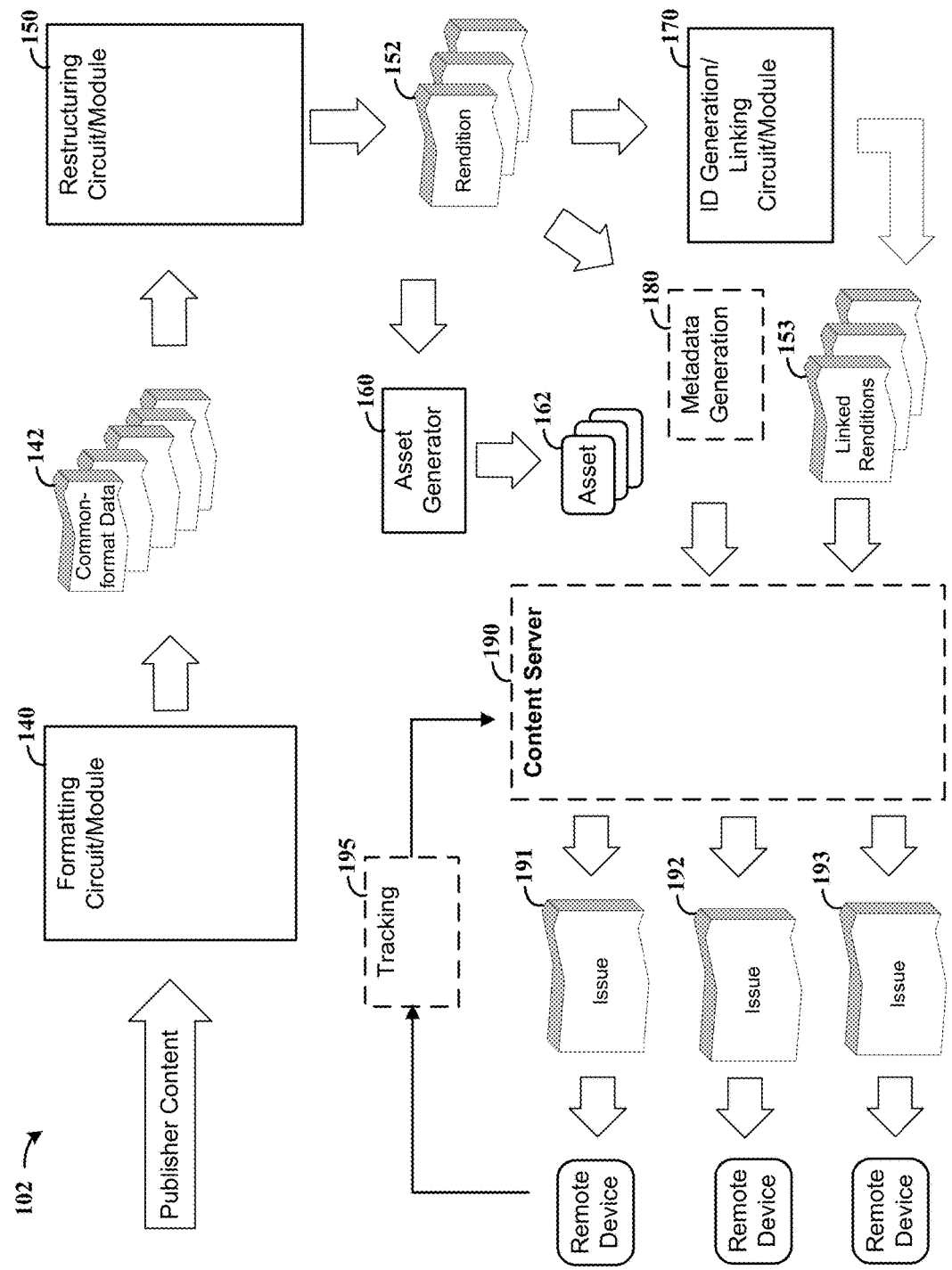
FIG. 1C shows an apparatus/method involving content formatting and restructuring, in accordance with one or more embodiments.

FIG. 1C shows an apparatus/method 102 involving content formatting and restructuring, in accordance with one or more embodiments. A formatting circuit/module 140 formats incoming publisher content, from disparate content providers, into portions of reformatted media content 142 having a common format type such as a canonical format. Publisher content, in this context, may include respective input renditions in disparate formats, which may further include associated metadata packages (e.g., a compressed file). A restructuring circuit/module 150 restructures portions of the reformatted media content 142 into renditions 152 having an article-oriented structure defined by the common format type. An asset generator 160 generates, for each rendition, respective reformatted assets 162 that are specific to one of a plurality of disparate types of devices that may access the rendition, based upon characteristics of the disparate device type. An ID generation/linking circuit/ module 170 generates ID data that is associated with the renditions, and links a respective portion or portions of each rendition 153 with portions of the media content data having disparate formats.

In some embodiments, a content server 190 operates to serve content issues (191-193 shown by way of example) having one or more renditions to respective remote devices. Such an approach may, for example, include combining renditions from a common publisher to provide a digital magazine to a user, or combining renditions from disparate publishers to generate a new digital magazine tailored for a specific user (e.g., as a virtual issue noted herein). Such a digital magazine may, for example, exhibit a cover similar to that shown at 194, with modifications therein to show different titles of different electronic magazine issues represented in the digital magazine. In this context, the content server 190 may transmit respective portions of the restructured renditions along with assets corresponding to the respective portion being transmitted, to users at remote devices. In some implementations, such transmissions to each user are based on media content access authorization data for the user, device-indeterminate ID linking data for the rendition(s), and characteristics of the remote device via which the user accesses the media content.

Some embodiments involve a tracking circuit/module 195 that operates to obtain tracking data from remote user devices and/or from other user access sources, directly or indirectly, and provide that data to the content server 190. The content server 190 uses the tracking data in one or more of a variety of manners, such as for combining renditions into issues, arranging assets, or providing different advertising in copies of the same issue provided to different users based on the tracking data as relative to each user. In a more particular embodiment, the tracking circuit/module 195 tracks access to the restructured renditions, such as renditions pertaining to articles. The content server 190 identifies new renditions from different ones of the respective issues for individual users, based on the tracking, media content authorization data for the user and characteristics of a remote device that the user employs to access the issues. The content server 190 further combines the identified renditions into a combined data set providing a digital magazine, and presents the digital magazine to the user.

In some embodiments, metadata is generated for each rendition at 180, and associated with each rendition. This metadata may, for example, include linking data generated at 170, include data linking some or all of each rendition with an article or articles, or with media content issues (e.g., digital magazine issues). This approach may be used, for example, to assign new metadata to articles or pages within articles, such as may be used to organize content within the articles relative to pages and/or assets on the pages.

Figure 1D:
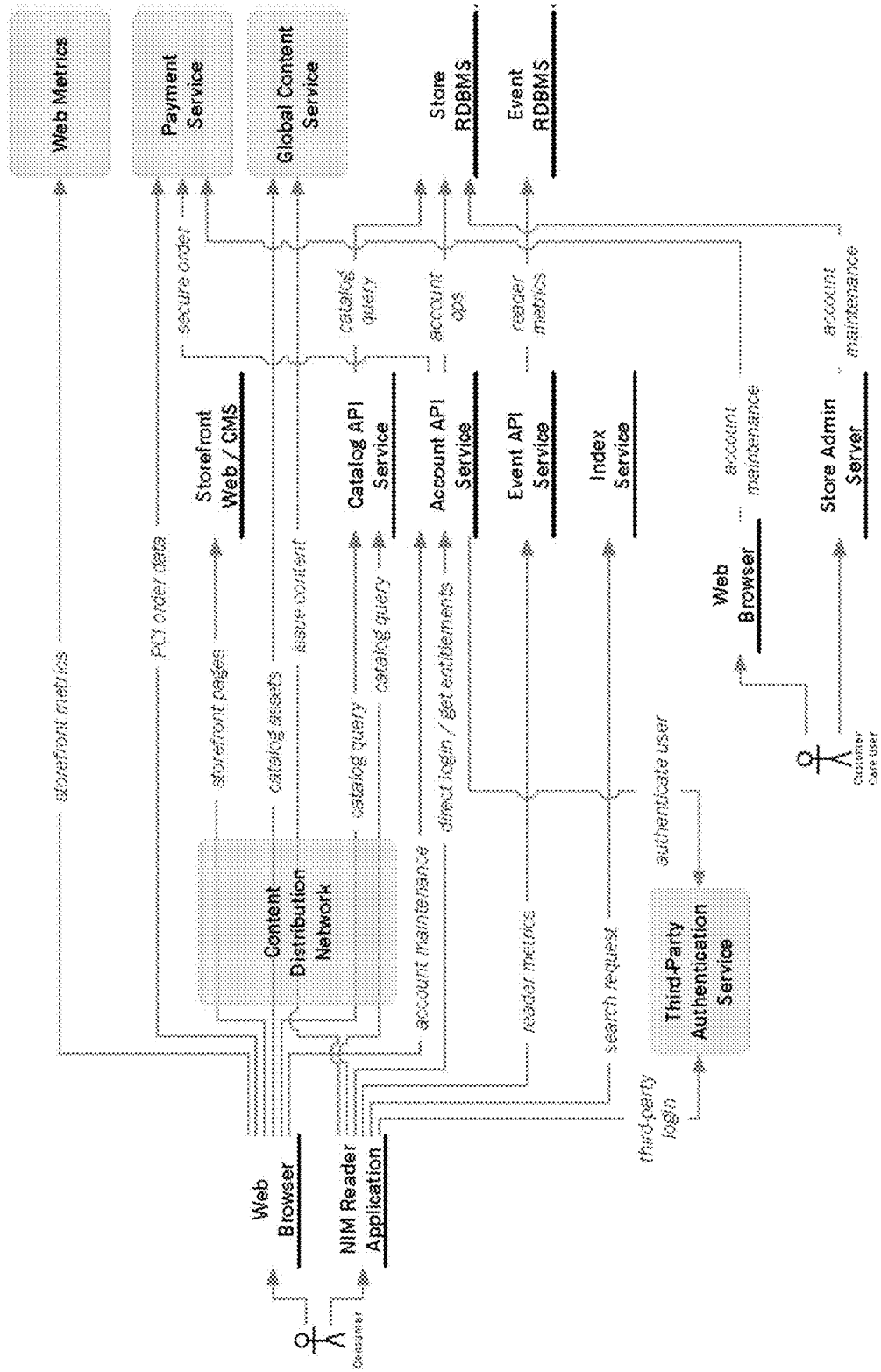
FIG. 1D shows a high-level overview of an apparatus and/or method, as may be applicable to systems relating to content consumption, in accordance with one or more example embodiments.

FIG. 1D shows a high-level overview of an apparatus and/or method, as may be applicable to systems relating to content consumption, in accordance with one or more example embodiments. A storefront Web/CMS interacts with users, with specific content that may be tailored as described herein. Further, the storefront Web/CMS can also be tailored to operate in accordance with a particular network or location (e.g., tailored to a particular entity offering internet access, and/or to a location at which the service is offered). A content management system can be implemented in this regard, for providing content access based on one or more of the user accessing the content, the content provider, or a provider of services that are used to deliver the content to the user. Respective application programming interfaces (APIs) can be used to provide cataloging, account services, event services and index services as shown. Resulting information can be stored (e.g., in a relational database management system—RDBMS).

Figure 1E:
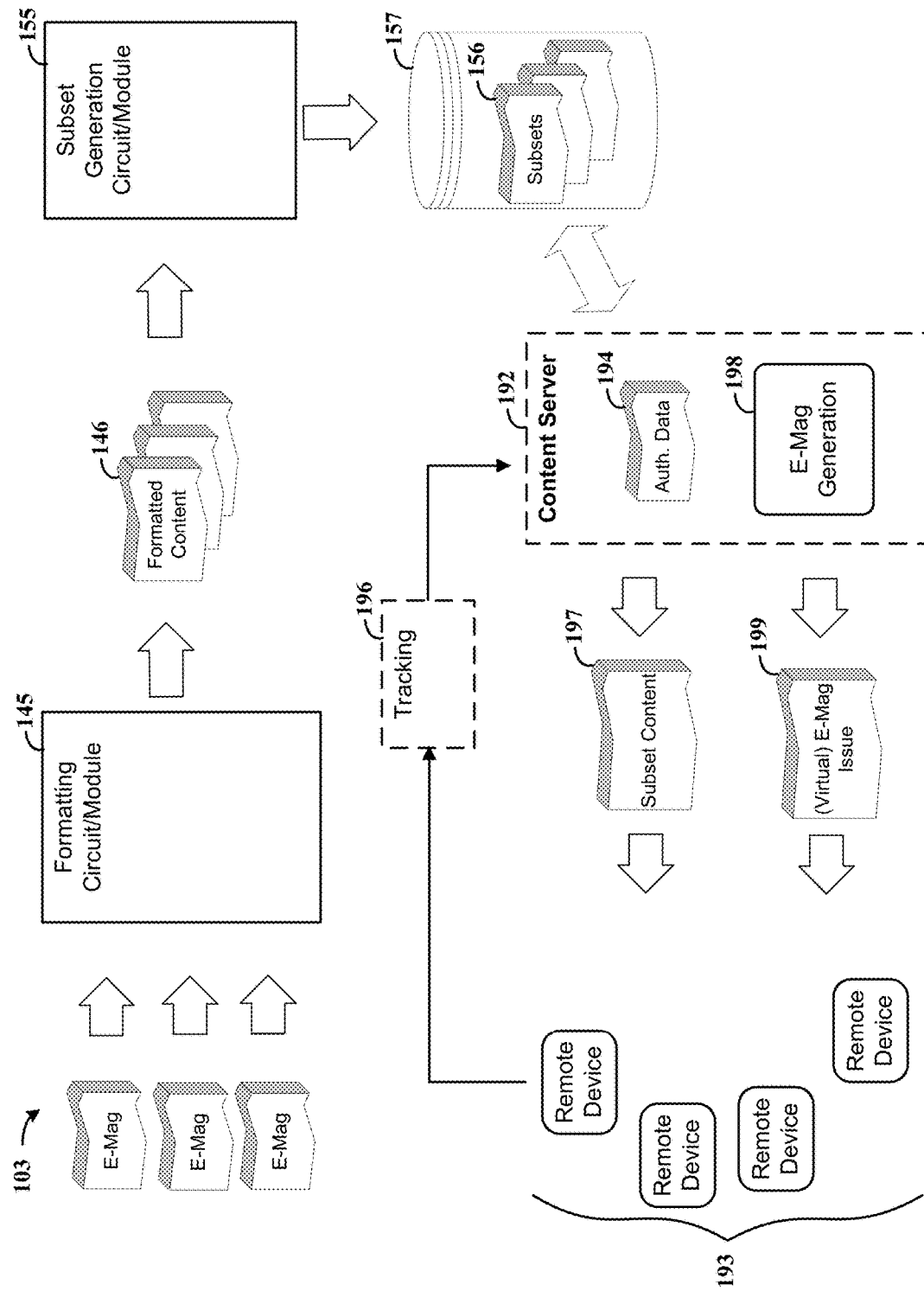
FIG. 1E shows a method/apparatus involving the generation of a specific electronic magazine based on user interests, as may be implemented in accordance with one or more example embodiments.

FIG. 1E shows a method/apparatus 103 involving the generation of a specific electronic magazine based on user interests, as may be implemented in accordance with one or more example embodiments. A formatting circuit/module 145 accesses respective sets of media content data associated with disparate electronic magazines (E-Mags) provided by disparate publishers, and formats the accessed sets into a common computer data format type 146. Each of the formatted sets of media content data 146 is broken into subsets 156 that are stored at 157. A content server 192 provides remote access to subset content 197 including one or more of the respective subsets of media content data 156, for users at respective remote interface circuits 193. In some instances this access is provided based on authorization data 194 specifying one or more electronic magazines that each user is authorized to access.

A tracking circuit/module 196 tracks access to the subset content 197 provided to the users, and provides data characterizing the tracked access for use by the content server 192. An electronic magazine generation circuit/module 198 operates to combine disparate ones of the subsets 156 to generate (virtual) electronic magazine issues 199 tailored to specific users. These generated electronic magazine issues may, for example, be generated by combining disparate ones of the subsets of media content data based on both the tracked access and authorization data 194 for the user. For instance, authorization data 194 may specify one or more electronic magazines that each user is authorized to access, such that subsets of different portions of magazines to which the user has access can be combined into such a virtual magazine issue including content from disparate publishers. This combination can further be effected using disparately-formatted data received from the publishers. Moreover, the combination and resulting electronic magazine layout can be effected using specified display characteristics relating to disparate publishers and disparate remote devices (via their capabilities), facilitating enhanced access and display capabilities.

In the various figures herein, circuits and/or modules may be combined, or separated into distinct circuits and/or modules. In this context, various embodiments involve one or more computer circuits that encompass(es) two or more circuits or modules as characterized herein, providing the relevant functionality that enhances operation of the computer circuits and related interaction with remote circuits, such as those employed within user interface devices. These approaches may be useful, for example, for configuring an interactive display of content (such as combined content from disparately-formatted sources) for use by individual users at disparate devices which would otherwise be incapable of displaying the content in respective formats or combined. This enhances operability of both content service provided via respective servers and end-user devices, as well as interaction therebetween.

Figure 2:
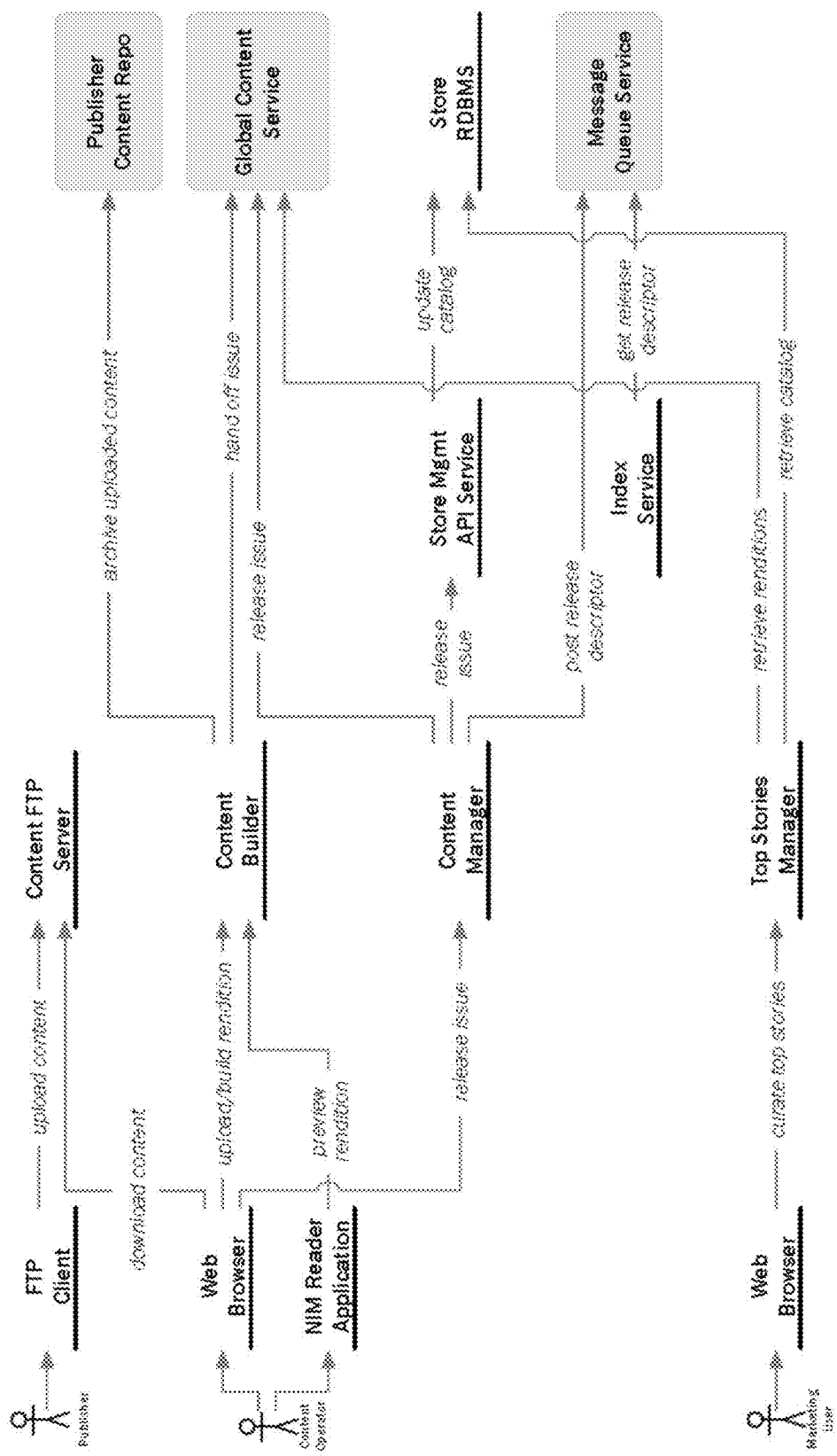
FIG. 2 shows an overview of systems relating to content production, in accordance with one or more embodiments.

FIG. 2 shows an overview of systems relating to content production, in accordance with one or more embodiments. A content builder module interacts with a content manager module via a global content service. The content builder module transforms content into a format as characterized herein, and delivers the content into a staging area from which the content can be accessed (released), as controlled by the content manager module. These modules may be integrated together.

Figure 3:
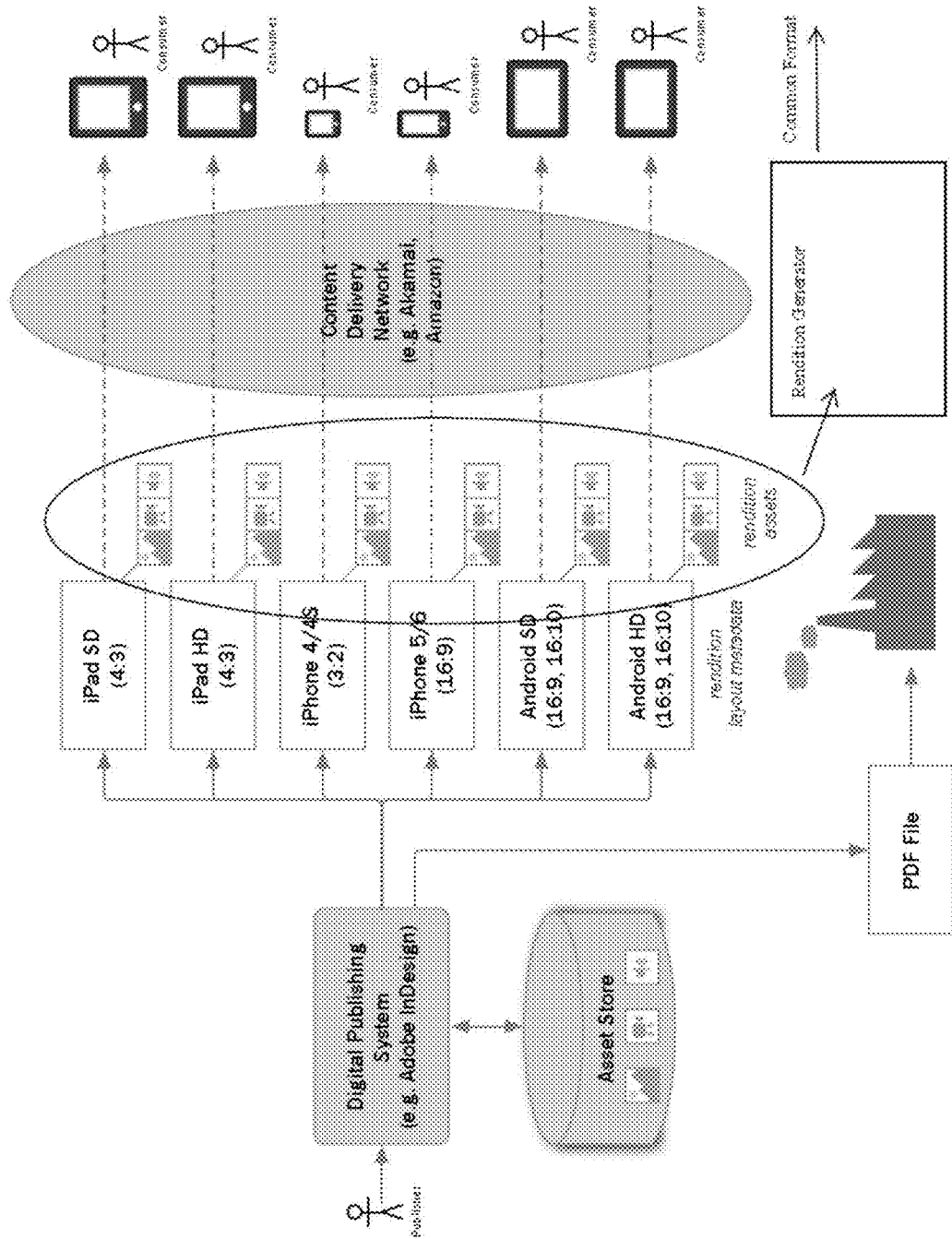
FIG. 3 shows a publishing apparatus and approach involving the generation of one or more renditions in a common format, that provides consolidated access to content otherwise provided in a disparate fashion, in accordance with one or more embodiments.
Figure 4:
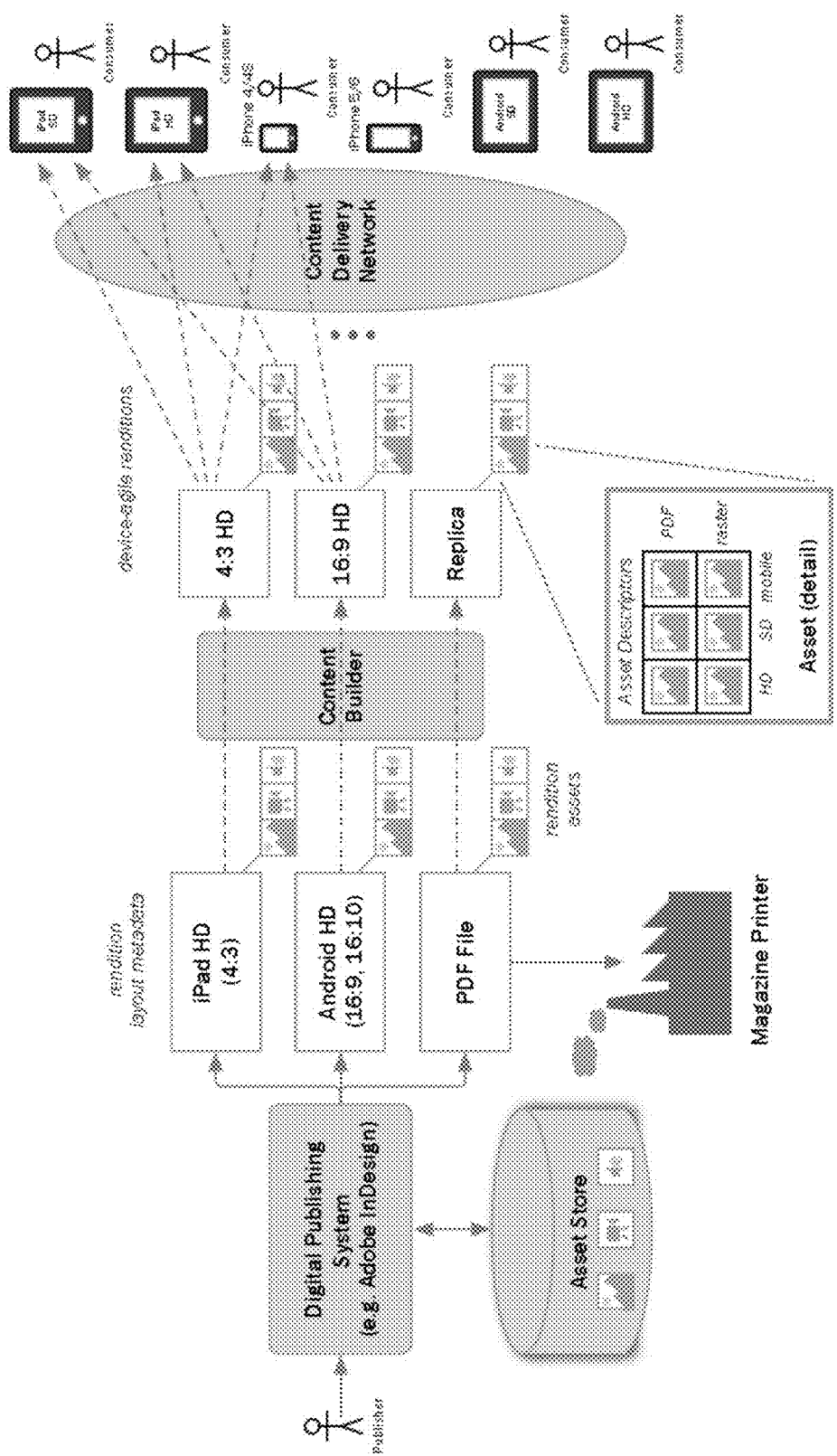
FIG. 4 shows an apparatus and approach with a single rendition having multiple physical assets for each logical asset, providing access to common content via different physical assets amenable to different device characteristics, in accordance with one or more embodiments.
Figure 5:
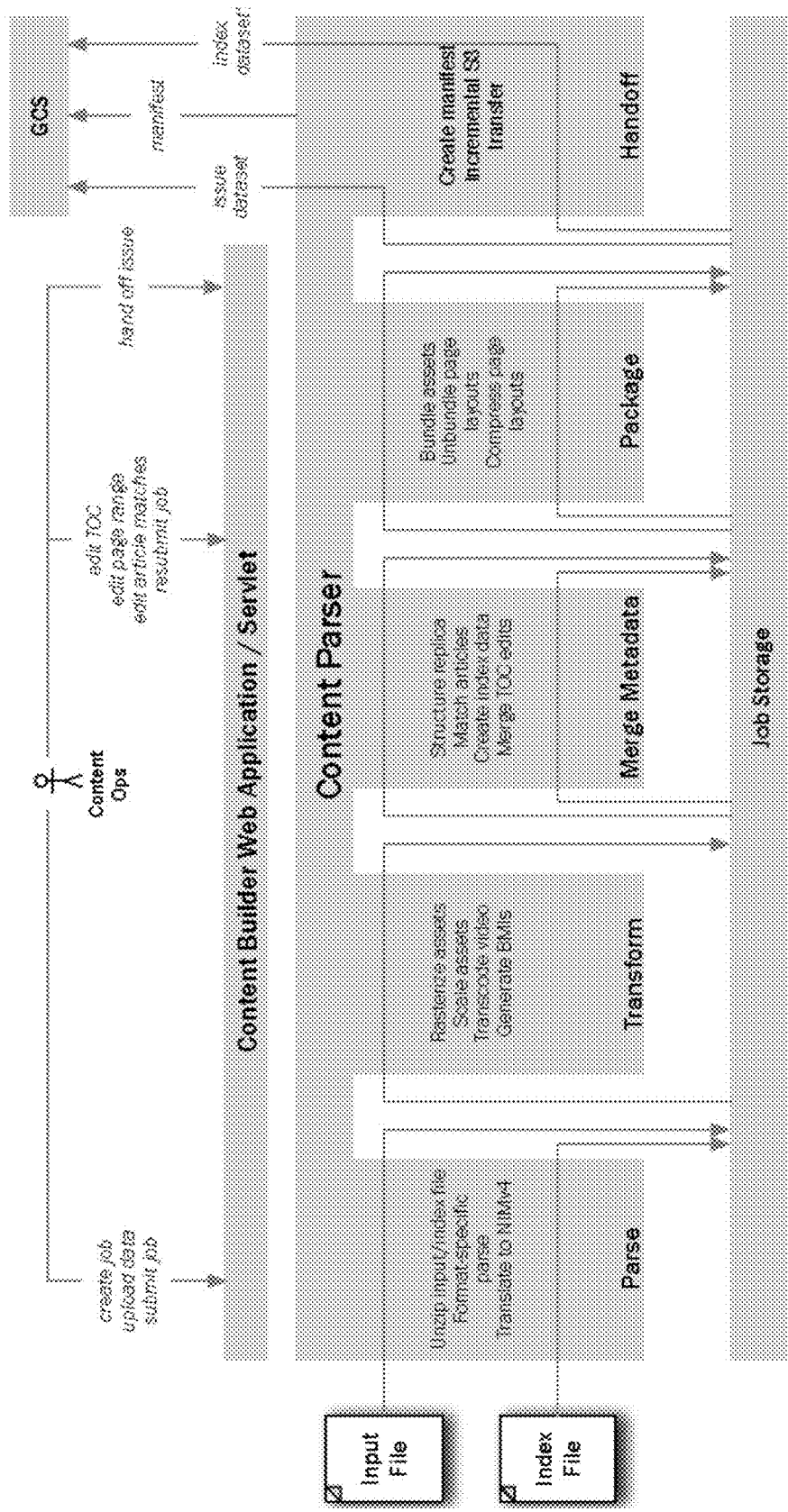
FIG. 5 shows an apparatus and approach with content building, in accordance with one or more embodiments.
Figure 6:
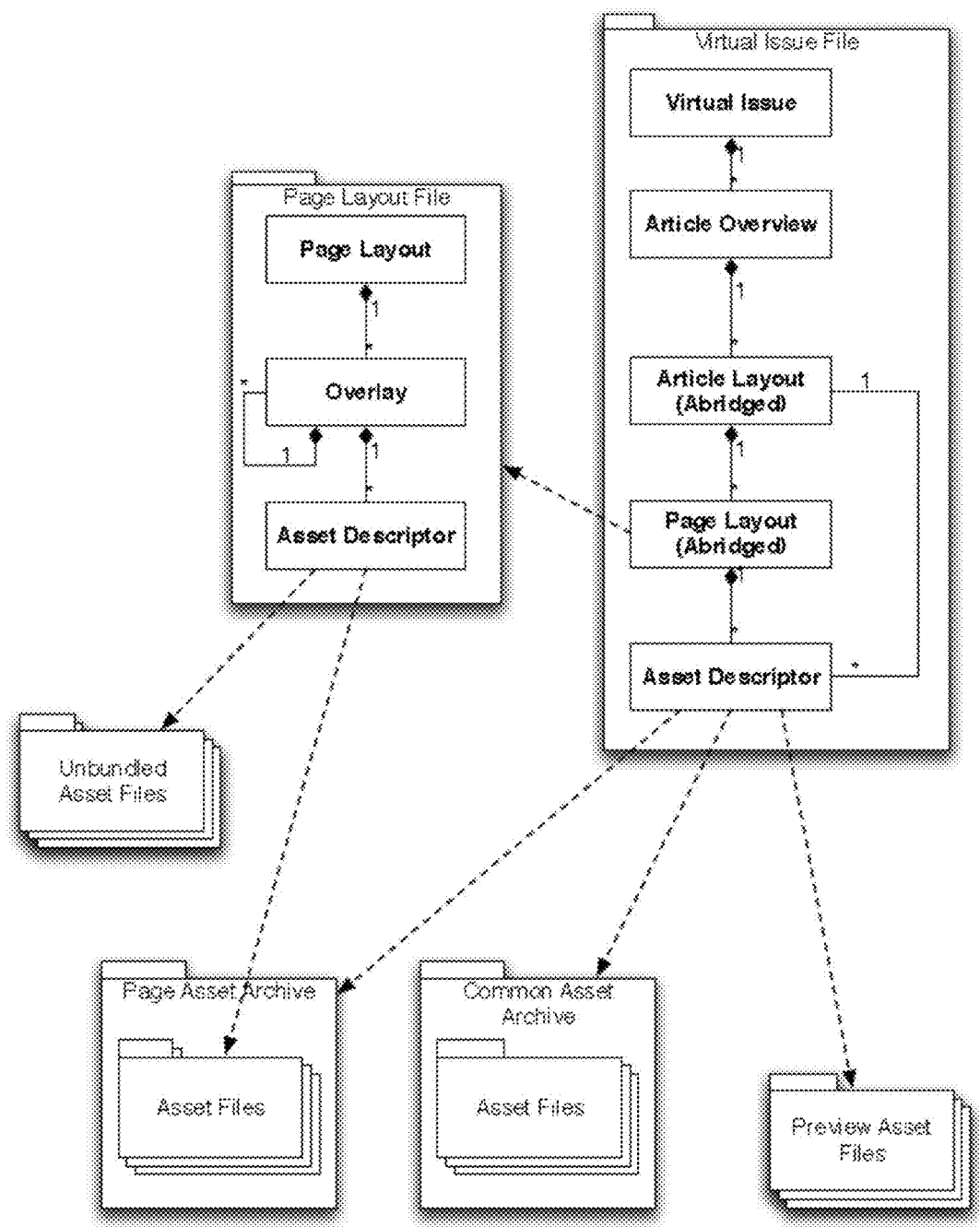
FIG. 6 shows a data storage/access apparatus and approach, in accordance with one or more embodiments.

FIG. 3 shows a publishing apparatus and approach involving the generation of one or more renditions in a common format, which provides consolidated access to content otherwise provided in a disparate fashion, in accordance with one or more embodiments. FIG. 4 shows an apparatus and approach with a single rendition having multiple physical assets for each logical asset, providing access to common content via different physical assets amenable to different device characteristics, in accordance with one or more embodiments. FIG. 5 shows an apparatus and approach with content building in accordance with one or more embodiments, and FIG. 6 shows a data storage/access apparatus and approach in accordance with one or more other embodiments. In various embodiments, incoming data is originally parsed and preserved for various uses and distribution to subscribers in accordance with various aspects characterized herein, such as with the formatting and restructuring approaches described above.

In some implementations, different content sources for a particular set of media content and related assets are combined and formatted to a common format as discussed herein. Common index formats are generated and linked relative to metadata, and different source renditions are correlated. For instance, publisher content (e.g., a rendition) for a particular magazine issue that is formatted for a specific user device can be taken in, reformatted into a general high-definition format, and scaled and formatted to provide assets that are accessible by a multitude of disparate types of devices.

In various embodiments, media content is reformatted to account for differences in device and display characteristics, such as aspect ratio and/or differences in display resolution. In some implementations, media content assets are formatted into separate physical assets for a particular logical asset to maintain certain compatibility, such as that relating to aspect ratio. For instance, separate sets of assets can be made for devices with different aspects ratios or different display sizes. Content can be scaled, such as for display on a large display class (e.g., tablets) or small display class (e.g., hand-held mobile telephones). In certain applications, changes in content may include reflowing text and providing different page layouts.

Various other embodiments tie in data on each rendition to a particular portion of source content, such as articles, sections or other structural components. Content assets and interactive elements may include, for example, images, audio, video, buttons, hyperlinks and pop-ups. For instance, data such as that relating to how users access various magazines, how much time they are spending on certain articles, and which advertisements are viewed can be traced back to source content via mapped content ID. As such, a rendition-dependent article ID can be used in recording data regarding the access to content in the specific rendition, along with a rendition-independent ID that maps the rendition back to an original set of media content to provide access information about supported device types. Such an approach may involve, for example, extracting and correlating metadata and other assets, and/or using correlation between respective renditions to track and match access data (e.g., by matching to a table of contents-type correlation of data). In this context, a rendition-independent ID may be mapped to several rendition-specific IDs. A similar approach can be used for tracking access to specific (logical) assets.

Data can be tied in or linked in a variety of manners. In some implementations, an interactive approach for tying or linking data employs both manual matching and automated matching. An initial automated match is carried out using a computer-type circuit to match portions of content from an input file to a new format or rendition, which can be carried out when the input file is transformed. A user can then review the result and correct errors. The new format/rendition is rebuilt using such user-corrected matching directives. In various such approaches involving the transformation of and related matching with publisher-provided input data, publisher-supplied metadata is used as a basis for matching articles across renditions. Publisher metadata is also used to provide article and section structure to renditions that do not naturally have structure, such as a PDF input supplied by publisher. The publisher metadata provides a common reference point between different renditions, and the same metadata can be used for all renditions of an issue. In various embodiments, publisher metadata associated with an input article or rendition is used to generate other renditions in different formats.

For certain types of documents such as PDF documents, publisher metadata describing organization of the PDF can be implemented in this regard to generate a table of contents. This can be particularly helpful where such documents are not provided with a table of contents or similar structure. For instance, certain types of documents, such as PDF documents, do not contain information that identifies article structure. For such documents, publisher metadata describing article organization can be implemented in this regard to generate the article-page containment hierarchy and a table of contents. This information can be linked to assets that provide content for each page, such as text, images and/or video.

Using approaches as described herein, usage data for a particular set of media content can be tracked across multiple devices and renditions. For instance, a person browsing a page or otherwise accessing an asset and spending 10 minutes doing so on a first type of tablet and another person spending 15 minutes on the same page or asset in a different format another type of tablet are matched. Such an approach may involve table of content-based matching, other hierarchical matching, and or aspects that relate rendition-specific IDs to rendition-independent IDs. Certain embodiments involve matching content from different formats using two or more statistical-type approaches.

Accordingly, content from various sources including magazines and others can be linked together and provided via a common format. Content can thus be automatically created, with information in the resulting combination displayed and accessed with related tracking across multiple scaling and format types. Non-homogeneous content from different sources can thus be linked and tracked commonly. For instance, web content or advertisements can be dynamically encapsulated into a common format, and may be mixed with other content such as publisher-based magazine content.

In more specific embodiments, content provided in a general format is reformatted and imparted with navigational and/or page layout metadata data. Such data may include, for example, page layout for the display of text and/or images, and navigational information for these items. The reformatted data (including any relevant assets) is configured and implemented for a device having a display type and/or processing system different than another device for which the layout/navigational data was generated, by converting the layout/navigational data for use with the device for which the reformatted data is configured. The converted data is used to generate structural views for the content on the device for which the reformatted data is configured, which is consistent with structural views of the content on the device for which the layout/navigational data was generated.

For instance, content that is provided in a portable document format (PDF) and having a corresponding initial format for a specific type of device (e.g., for a specific brand of tablet) can be processed to generate content in format that is different than that of the specific type of device but having a layout and navigational information that generally matches that of the initial format. Such PDF content may not have article structure or other metadata associated with it, in which case layout and navigation data is generated to provide a structure that matches that of the initial format, or that does so with scaling applied (e.g., for differently-sized displays). The generated data may thus impart article structure as well as other aspects such as navigational aspects relating to other content.

Accordingly, various embodiments are directed to generating a common content format with a layout and navigation, for multiple different types of received content including content having a format for a specific device, content having article structure without navigation, and content generally format-free such as content in a PDF. The common content format can then be used to generate content for a multitude of different types of devices, which can be implemented to track metadata for the content. Accordingly, a common view and/or navigational structure are provided for access via disparate types of devices. These approaches facilitate user navigation as well as tracking for intermittent access to content and for identifying content access by multiple users. For instance, media content in the form of magazine articles may have different numbers of pages, different layouts, and different renditions. Access to portions of the articles (e.g., pages, or assets) via different types of devices is tracked similarly, to provide an indication of the content accessed independently of the page on which the content is provided or the location on the particular page being viewed.

In some embodiments, magazine data is formatted from original/input data having sections, a collection of articles in each section, and a collection of pages in each article. An index file is created to characterize the magazine, such as to indicate where each article starts in the data. Text can be obtained for each article or page of an incoming article, and broken into subsets of text (e.g., a certain number of words), and the words are processed with a search engine to correlate the text subset with a particular article or page of the incoming article. For instance, certain subsets may span more than one article or page, and a particular page may include text from two or more subsets.

In some implementations, the subsets of text are selected in a manner that facilitates correlation to articles, pages or other components of original documents. For instance, if text is extracted from an original document having a four-page article, subsets of text in the article may be correlated to four different pages in a resulting reformatted media file. In some implementations, page ranges for an article are identified using a search engine approach to match pages of an incoming article to a page range in reformatted media content. As may be consistent with auto-correlating, the page ranges are compared relatively (e.g., as two linear arrays or linear matrixes that can be slid over one other). Once the page ranges are matched (e.g., via a highest page correlation relative to position), the incoming and reformatted content are anchored against each other, and data can be filled in the reformatted version or otherwise adjusted to accommodate mismatches. Further, navigational information can be generated using such matching aspects.

Rendition-independent tracking data is provided and used in a variety of manners to track articles as accessed in various different renditions. In various implementations, data-matching is carried out to identify common content presented in different renditions. One such approach involves the use of a search engine type function as discussed above for text. Other approaches involve the matching of image data. In various contexts, an index of content is created in one domain, and matched to content in another domain using search expressions to find the best match. This information can be used to correlate portions of media content, such as articles. The portions of media content are correlated to a general identification, such as to an index file, that can be used to identify content independently of the end-use format/rendition of that content and the device on which the content is accessed. Such approaches may, for example, be implemented in matching data for media content that has been converted to a common format, back to an original media content file from which the data in the common format has been generated.

These approaches may also be implemented to match different formats of a common set of data within a rendition or in respective renditions of the media content generated from the media content in the common format. Device-independent identification data can thus be assigned to the content in accordance with the common format, with the match (or other linking data) used to correlate content in the renditions back to the media content in the common format. In some implementations, assets may be linked back to content in such an original media content file, generally or specifically. This device-independent data may, for example, link magazine content back to an original magazine article. In various implementations, original media content files used in this context are modified to facilitate searching and matching.

In various embodiments, interactive functions provided in an original media content file are linked to a converted version of the media content file in a common content format. These interactive functions are correlated with related text or imagery as in the original media content file. Similarly, attributes of media content variations, such as high-resolution and low-resolution options as well as high-bandwidth or low-bandwidth (e.g., with lower resolution and/or fewer data-rich components), can be linked back to the original media content. This may, for example, involve linking different physical assets back to a single logical asset. Similarly, different versions of executable code or other interactive components such as web links as implemented on disparate end-user devices can be linked to one another.

Figure 7:
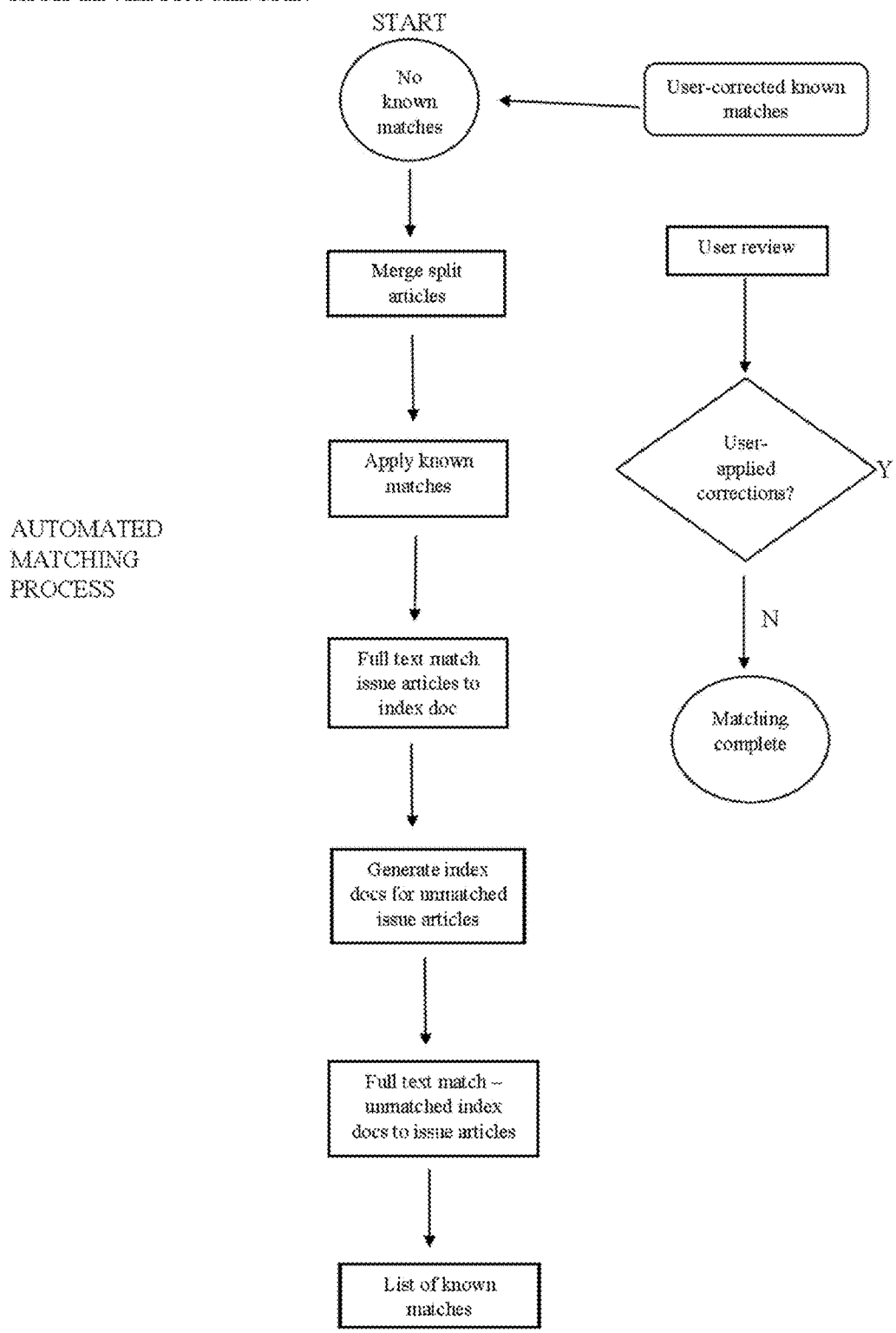
FIG. 7 shows an approach involving the creation of interactive renditions, in accordance with another example embodiment.

In some embodiments, interactive renditions are created using an article matching approach, using an approach such as shown in FIG. 7. Each article is matched to a particular publisher, with metadata used such that each article has a rendition independent ID.

In various embodiments, linking of text is carried out for articles provided with publisher metadata that includes a collection of index documents, with one index document for each magazine article. Such index documents may, for example, involve publishing requirements for industry standard metadata (PRISM) format XML files. In certain approaches, rendition-independent ID can be computed using a hash function on input data including globally-identifying code for a magazine title, the cover date of the magazine issue and an identifier for the article that is unique within the magazine issue.

Figure 8:
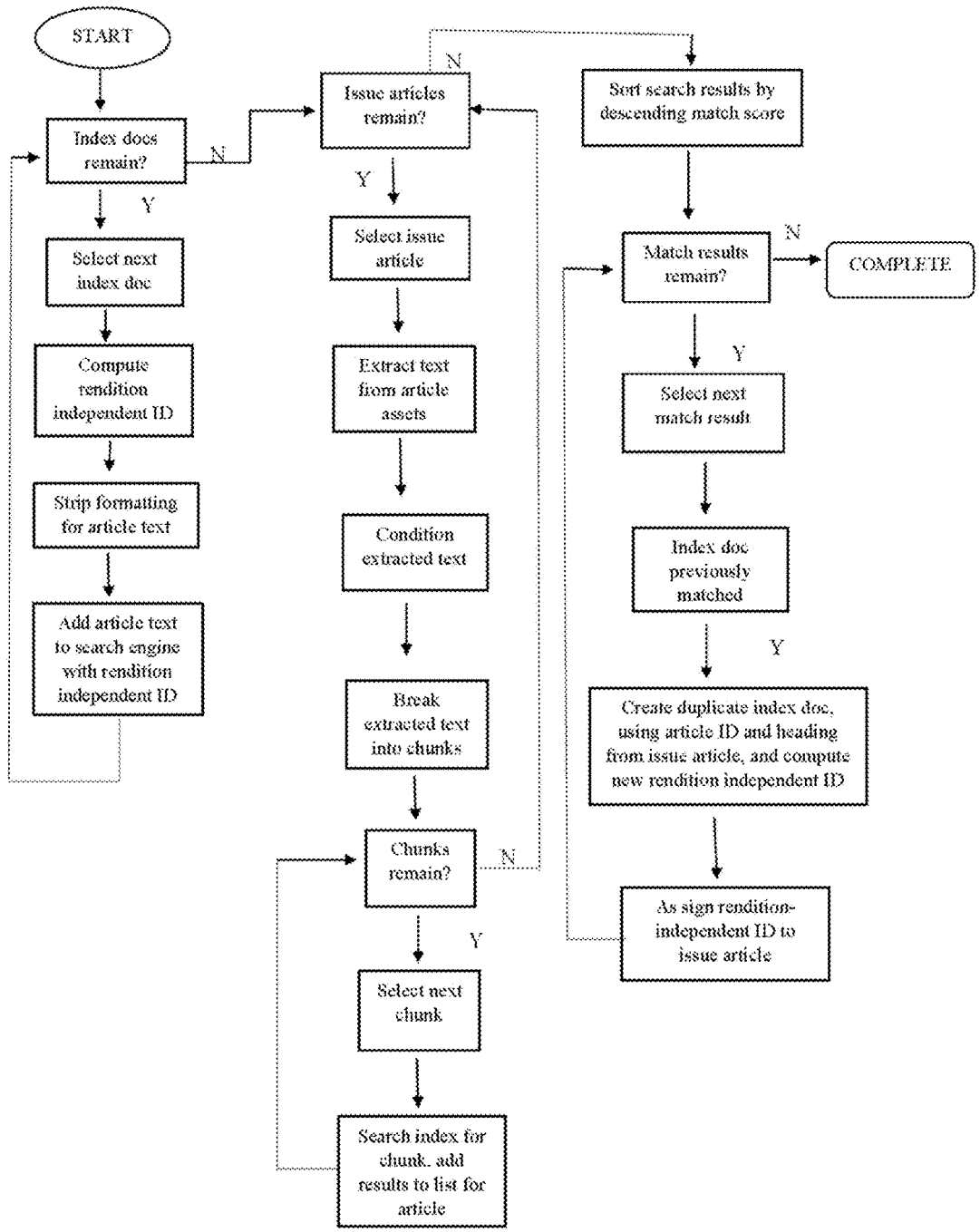
FIG. 8 shows a full-text matching procedure as may be carried out with the approach shown in FIG. 7, in accordance with another example embodiment.

In certain embodiments, a full-text matching procedure is carried out shown in FIG. 8, for an "issue article to index docs" step of the approach shown in FIG. 7. Where unmatched index documents are linked to issue articles, data is stored in the search index and data is chunked and used in searches.

Figure 9:
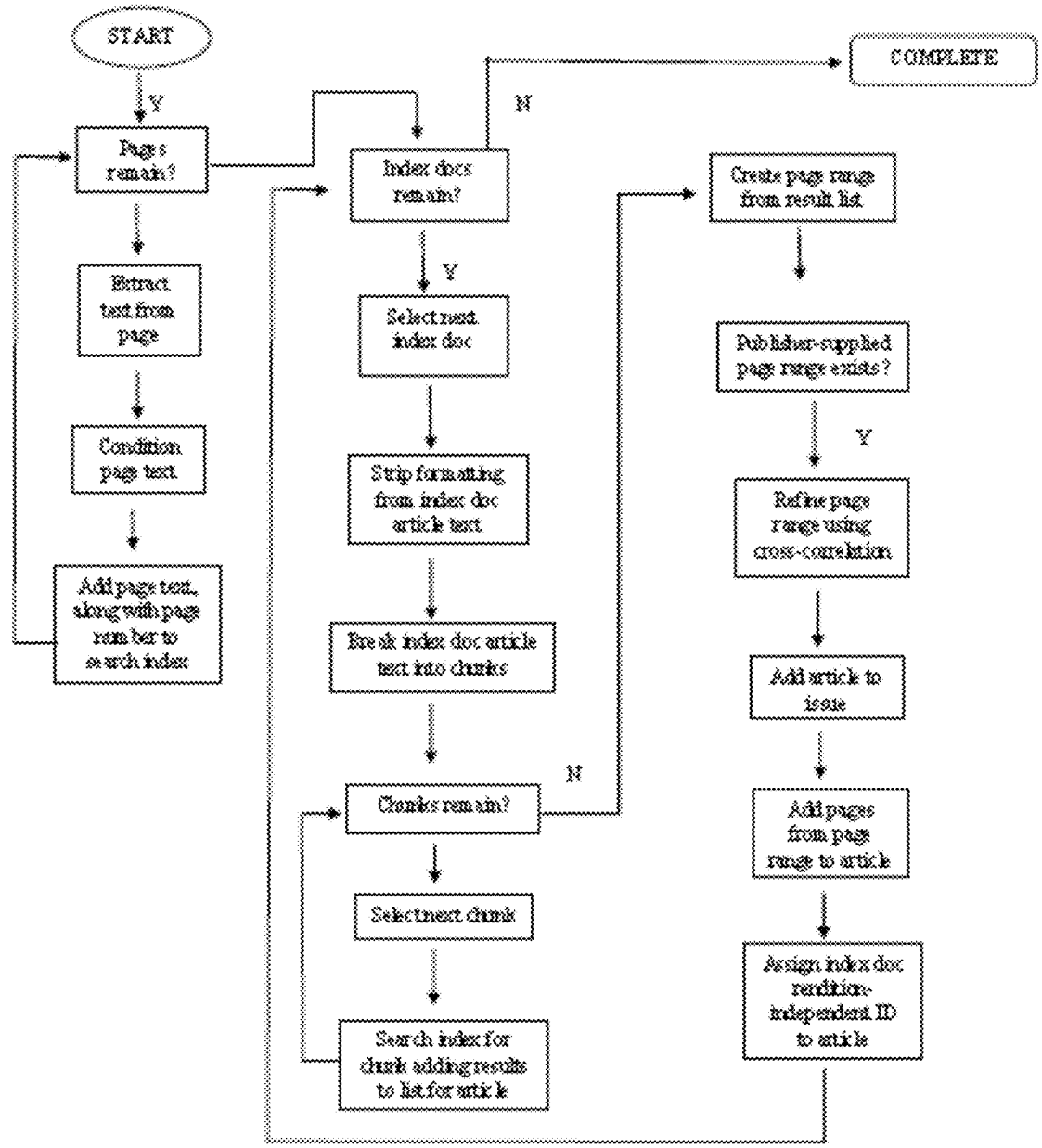
FIG. 9 shows an approach involving matching with replica renditions with no article structure, in accordance with another example embodiment.

In certain embodiments involve replica renditions such as PDF-based renditions that have no article structure, page matching is carried out as shown in FIG. 9. The article structure is generated using publisher metadata so that table-of-contents navigation can be performed in the reader, and so that articles are correlated by a rendition-independent ID against counterpart articles in other renditions.

Figure 10A:
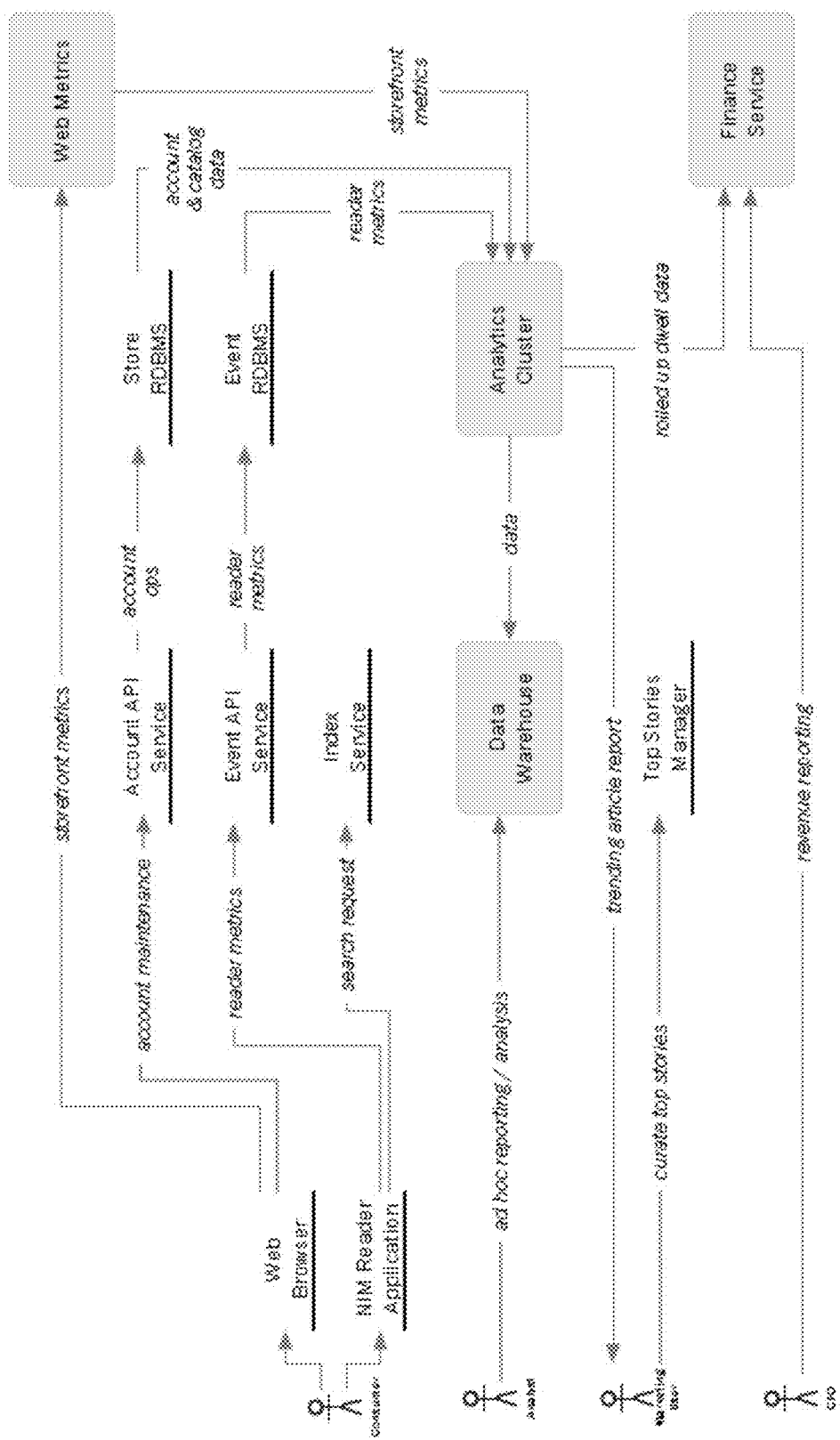
FIG. 10A shows a system as may be implemented for data management, in accordance with another example embodiment.

FIG. 10A shows a method and apparatus for managing data. Reader metrics, storefront metrics and account & catalog data are loaded into an analytics cluster, which processes the data to provide characterizations of the inputs. For instance, metadata can be used to track usage of content, which is in turn used to identify top stories or other components that can be used across multiple users.

Figure 10B:
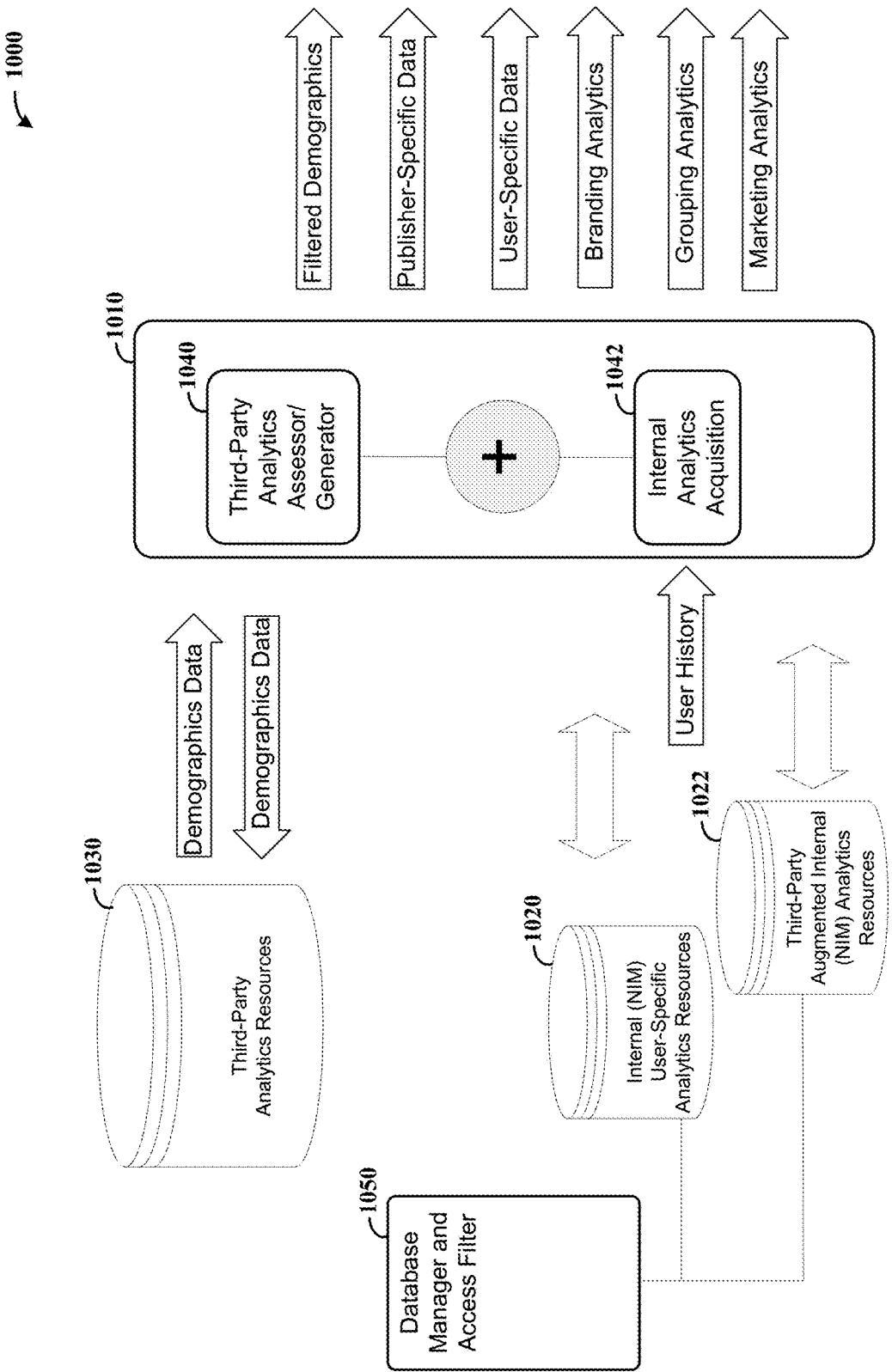
FIG. 10B shows a system with analytics-based aspects, in accordance with one or more embodiments.

FIG. 10B shows an analytics-based apparatus 1000, as may be implemented with the analytics cluster in FIG. 10A and/or as a separate embodiment. The apparatus 1000 includes an analytics module/engine 1010 that utilizes analytics data, to provide information that can be used in a variety of manners, including for restructuring media content. For instance, the restructuring instructions may be provided at block 122 in FIG. 1A, restructuring circuit/module 150 in FIG. 1C, or electronic magazine generator 198 in FIG. 1E. These aspects can be provided within a Next Issue Media electronic magazine system. The analytics data may be accessed by using one or more of: internal analytics resources 1020 (e.g., obtained via tracking at 195 in FIG. 1C); external/third party analytics resources 1030 (e.g., based on user demographics provided from third-party sources); the generation of analytics data at analytics assessor/generator 1040 or assessor/generator 1042. A database manager/access filter 1050 operates to control access to the respective resources.

The analytics data may be generated, for example, in conjunction with the tracking noted in FIG. 1C and characterized herein, such as by generating analytics pertaining to user access to renditions. This analytics data can be generated for disparate users, or for users grouped together (e.g., based on commonalities). Further, the analytics data can be generated as hybrid data, utilizing demographics data provided by third-party analytics resources at 1030 together with user-specific (private) internal resources at 1020 and/or as generated. Augmented internal analytics resources can be generated at 1042 and stored at 1022, used internally and/or provided to external entities via access that is filtered by the database manager/access filter 1050. For instance, filtered demographics can be provided to indicate an enhanced demographic information, based upon tracking internally to the NIM system. Publisher-specific data can be provided to publishers for analytics information pertaining to that publisher's material. User-specific data can be provided to each user or to a group of users (e.g., to an entity/employer for generating employee-based analytics). Branding analytics data can be generated for indicating successful/desirable branding approaches. Marketing analytics can be provided to provide an indication of success of certain marketing approaches. In various implementations, these types of data can be generated using private analytics internal to the NIM system (e.g., to analytics module/engine 1010), while maintaining confidentiality of the private analytics themselves.

The following discussion exemplifies how the overview diagram of the analytics-based system 1000 of FIG. 10B might be used. Assuming two primary databases of relevant user demographics (1020 and 1030), analytics data is collected from external (third-party) resources and also collected from the system's ongoing tracking of subscriber accesses to magazine-directed products generated by the system (e.g., at the output of analytics module/engine 1010). The system's ongoing tracking of subscriber accesses are much more user-specific as the system uses cookies and other memory tools to track which articles, article types and advertisements the subscribers have reviewed, read and/or hyperlinked to for further information. The analytics data collected from external (third-party) resources is less specific to the user as it includes higher-level information such as tendencies of users having relevant/common age, geographic device location, purchases tendencies (e.g., more elite/expensive products, sales) and areas of interest (e.g., type of sport, fiction reading, politics). Within analytics module/engine 1010, the system is configured to employ as a starting point, the more user-specific data and then probe an expanded range of the user's access tendencies by exploring and then tracking whether user accesses (and to what extents) new products aspects (e.g., if the user was tracked by his/her accesses of articles on democratic-party politics, the system might market to the same user articles on politics which feature more neutral/independent positions and track how the user reads/treats such featured articles). Such efforts by the system to further explore and then track the user stems from: (i) the system's ongoing tracking of subscriber accesses to magazine-directed products; and (ii) likelihood assessments that data from that internal gathering effort is common with the above-mentioned third party demographics data. This combined information is depicted with the additive symbol "+" in block 1010 of FIG. 10B. Further, by weighting each common attribute and also weighting the extent to which the user is (e.g., heavily) interested in the known products, the system can use the weighting to assess the likelihood of the user being interested in new articles and related offerings. As discussed above, this further access information can be tracked and used to evolve and augment the internal data for further iterative magazine product offerings, for successful/desirable branding and marketing efforts.

Figure 11:
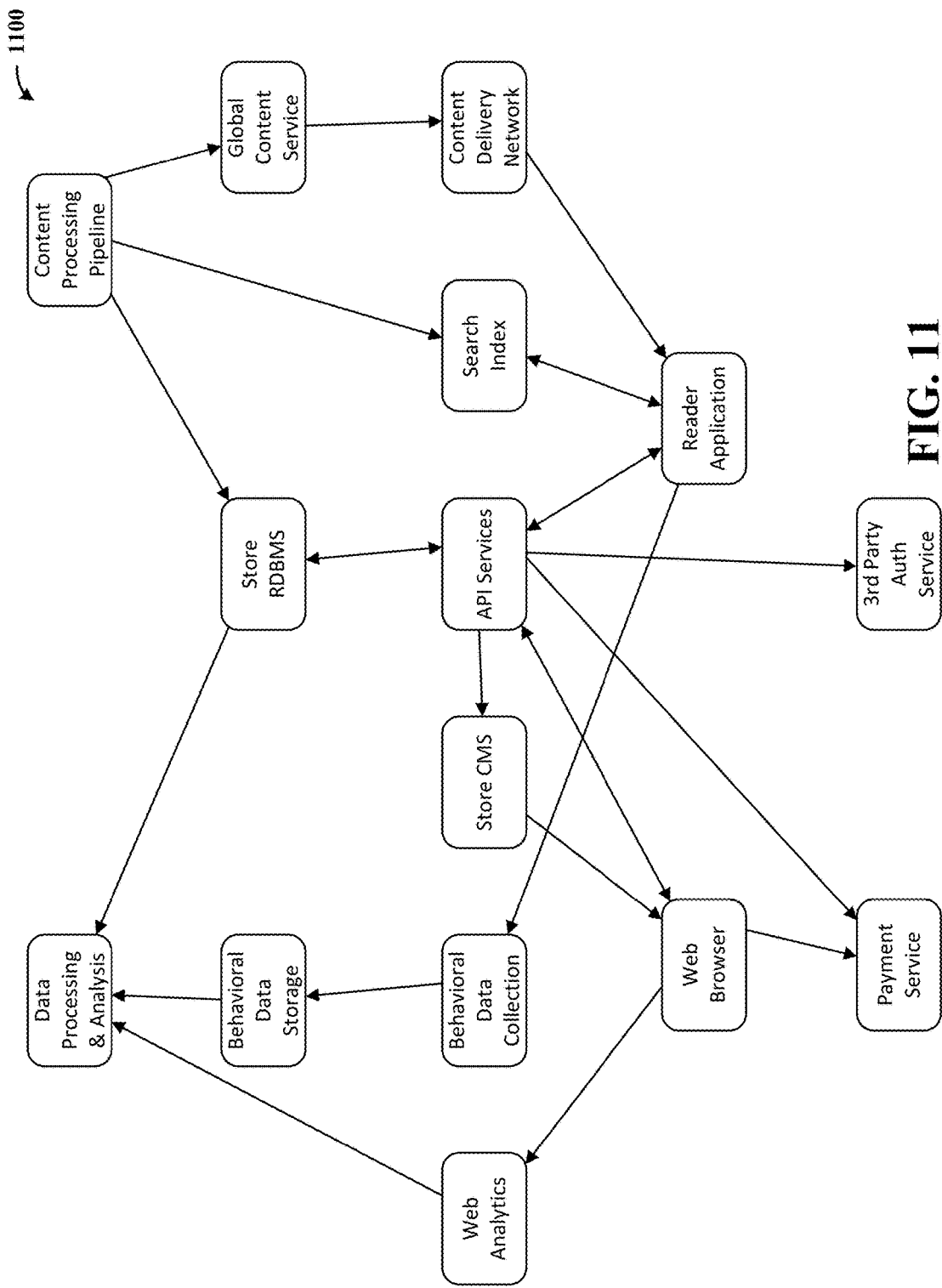
FIG. 11 shows a system as may be implemented for correlating prior and current record linkage results, in accordance with another example embodiment.
Figure 12:
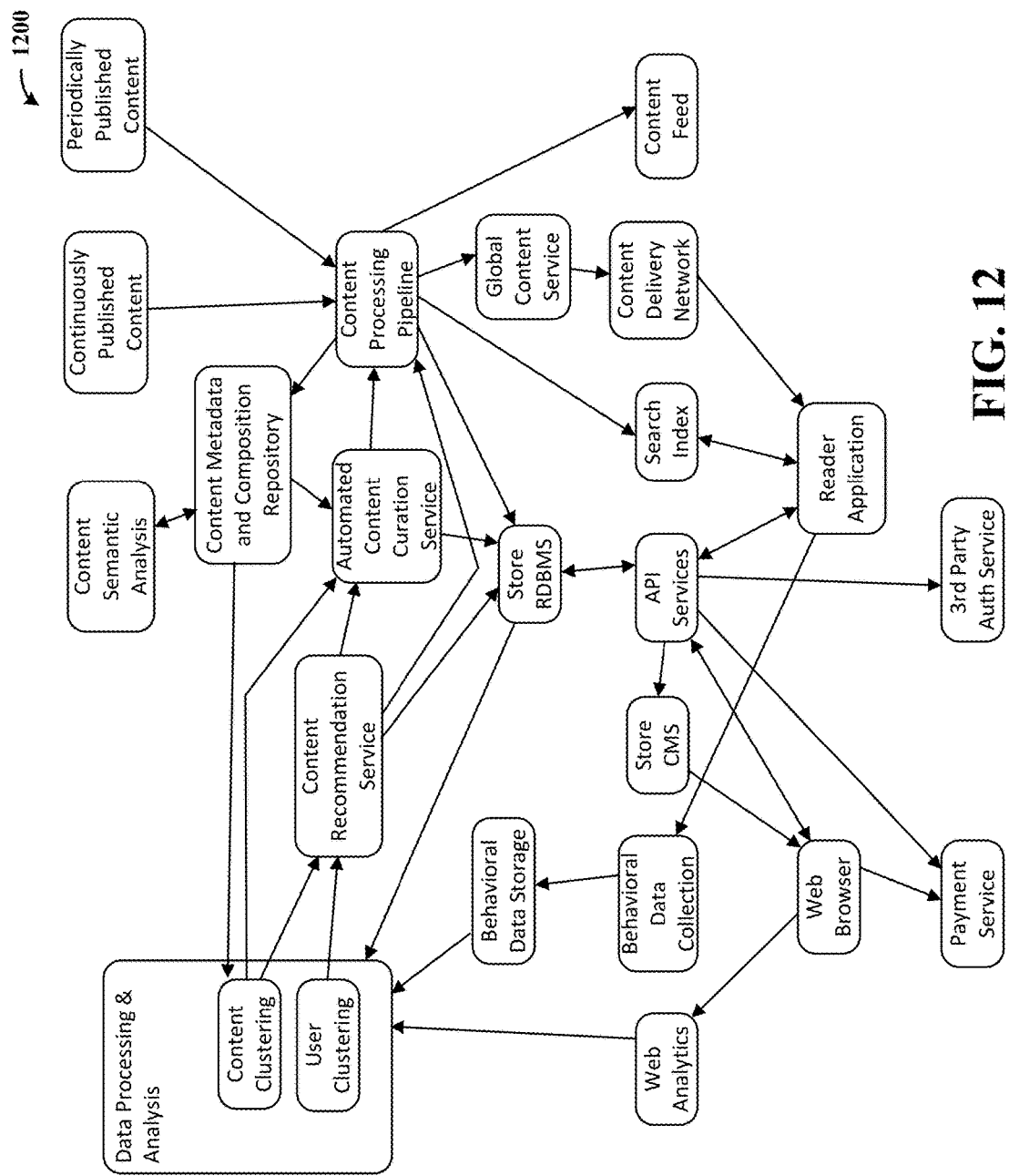
FIG. 12 shows another system as may be implemented for correlating prior and current record linkage results, in accordance with another example embodiment.

FIG. 11 shows a system 1100 as may be implemented for correlating prior and current record linkage results, in accordance with another example embodiment. FIG. 12 shows yet another system 1200 as may be implemented for correlating prior and current record linkage results, in accordance with another example embodiment. Each of the respective components is carried out in accordance with one or more embodiments per the indicated function, as may be consistent with the above.

In various embodiments, approaches as above are implemented in the context of providing media content access options to a user (e.g., articles in a magazine), with requested articles being reformatted on-the-fly for the user's device from commonly-formatted data as noted. Accordingly, such a magazine includes multiple files that may be presented separately to the user as access is requested, without providing the entire magazine (or, e.g., without providing an entire article).

Various blocks, modules or other circuits may be implemented to carry out one or more of the operations and activities described herein and/or shown in the figures. Also, the skilled artisan would also recognize that various terminology as used in the Specification (including claims) connote a plain meaning in the art unless otherwise indicated. As examples, the Specification describes and/or illustrates aspects useful for implementing the claimed invention by way of various blocks, modules and/or other circuits which exemplify how certain embodiments may be carried out in the form or structures, steps, functions, operations, activities, etc. In these contexts, a "block" (also sometimes "logic circuitry" or "module") is a circuit that carries out one or more of these or related operations/activities (e.g., the content builder and manager blocks of FIGS. 1A-1E, or respective content builder, parsing, and other blocks as shown in FIGS. 4-7). For example, in certain of the above-discussed embodiments, one or more modules are discrete logic circuits or programmable logic circuits configured and arranged for implementing these operations/activities, as in the circuit modules shown in FIGS. 1A-1E and/or in related aspects as combined with one or more of the recited patent documents herein.

In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described in connection with one or more of FIGS. 1A-1E is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as another circuit, server, module, or processor the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured and arranged to format . . . " is interpreted as "circuit configured and arranged to format . . . ").

Based upon the above discussion and illustrations, those skilled in the art will readily recognize that various modifications and changes may be made to the various embodiments without strictly following the exemplary embodiments and applications illustrated and described herein. For example, relative aspects of different arrangements of renditions may be combined and used for respective types of devices. In addition, the various embodiments described herein and in the referenced patent documents may be combined in certain embodiments, and various aspects of individual embodiments may be implemented as separate embodiments. Such modifications do not depart from the true spirit and scope of various aspects of the invention, including aspects set forth in the claims.

What is claimed is:

1. A method comprising:
    formatting different types of media content data having disparate formats and corresponding to respective sets of media content received from disparate content providers, into media content data in a common format type;
    restructuring portions of the media content data in the common format type into restructured renditions having an article-oriented structure defined by the common format type;
    for each rendition, generating respective reformatted assets, each reformatted asset being specific to one of a plurality of disparate types of devices, based upon characteristics of the disparate device types;
    generating device-indeterminate ID linking data that links respective portions of each rendition with portions of the media content data having disparate formats;
    for each of a plurality of users, providing access to information characterizing the renditions in the article-oriented structure, and collecting user inputs pertaining to the information characterizing the renditions; and
    transmitting respective portions of the restructured renditions, along with assets corresponding to the respective portion being transmitted, to users at remote user interface circuits based on, for each user:
        the collected user inputs,
        media content access authorization data for the user,
        the device-indeterminate ID linking data, and
        characteristics of the remote user interface circuit via which the user accesses the media content.

2. The method of claim 1, further including:
    storing the media content in the common format type; and
    for each subscriber,
        generating subscriber-specific content library data by generating data that links one or more sets of the stored media content to the subscriber, and
        notifying the subscriber of content in the subscriber-specific content library by providing information indicative of the content to the subscriber.

3. The method of claim 2, further including, in response to the notifying, sending subscriber-relevant information to the subscriber, the subscriber-relevant information including information that is not identified by the subscriber-specific content library data.

4. The method of claim 3, wherein the subscriber-relevant information includes at least one of offers, advertisements, promotions, and sample-previews.

5. The method of claim 3, further including communicating access information with the subscriber pertaining to services, goods or additional content that is available to the subscriber but not included in the subscriber-specific library, the access information including information for providing the services, goods or additional content to the subscriber.

6. The method of claim 5, wherein transmitting the respective portions of the restructured renditions includes transmitting the restructured renditions pertaining to the services, goods or additional content.

7. The method of claim 2, further including, in response to the notifying, providing access to a set of the stored media content corresponding to the content based on the subscriber-specific content library data.

8. The method of claim 1, wherein
    the sets of media content include electronic magazine issues from different electronic magazine publishers, and
    the restructured renditions are arranged in an article-oriented structure for an electronic magazine including sets of media content from different ones of the electronic magazine issues.

9. The method of claim 8, further including, for at least one of the users, restructuring the portions of media content data representing different ones of the electronic magazine issues in the common format into a virtual magazine issue based on the user inputs collected for the at least one of the users, and transmitting the virtual magazine to the at least one of the users, thereby providing the at least one of the users with a user-specific virtual magazine characterized by the inputs provided by the at least one of the users.

10. The method of claim 9, wherein the user inputs characterize information selected from the group of: keywords, subject areas, and dates.

11. The method of claim 1, further including, for at least one of the users, restructuring the portions of media content data in the common format into an additional rendition based on the user inputs collected for the at least one of the users, and transmitting the additional rendition to the at least one of the users, thereby providing the at least one of the users with a user-specific rendition characterized by the inputs provided by the at least one of the users.

12. The method of claim 1, wherein transmitting the respective portions includes:
selecting a first one of the respective portions based on the collected user inputs, media content access authorization data, device-indeterminate ID linking data and characteristics of the remote user interface circuit, and
selecting a second one of the respective portions based on the selected first one of the respective portions, and
transmitting the first and second one of the respective portions.

13. The method of claim 1, wherein providing the access to information characterizing the renditions includes identifying the renditions that the information characterizes based on at least one of the collected user inputs, media content access authorization data, device-indeterminate ID linking data and characteristics of the remote user interface circuit.

14. The method of claim 13, further including,
in response to the user inputs, generating information characterizing user access conditions for the identified renditions, and
in response to the user satisfying the user access conditions, transmitting respective portions of the restructured renditions corresponding to the identified renditions.

15. The method of claim 14, wherein generating the information characterizing user access conditions for the identified renditions includes generating information selected from the group of: offers, advertisements, promotions, and sample-previews.

16. The method of claim 1, wherein
the collected user inputs include historical access to portions of the renditions, and
transmitting the respective portions of the restructured renditions includes, for each user, identifying the respective portions of the restructured renditions based on the historical access by other users that said user identifies, thereby providing said user with restructured renditions corresponding to renditions accessed by the other identified users.

17. A method comprising:
restructuring portions of media content data corresponding to respective sets of media content received from disparate content providers, into at least one restructured rendition having an article-oriented structure;
generating device-indeterminate ID linking data that links respective portions of each rendition with media content in the respective sets of media content;
providing user access to information characterizing the renditions in the article-oriented structure, and collecting user inputs pertaining to the information characterizing the media content sets; and
transmitting respective portions of each rendition to users at remote user interface circuits based on, for each user:
the collected user inputs,
media content access authorization data for the user,
the device-indeterminate ID linking data, and
characteristics of the remote user interface circuit via which the user accesses the media content.

18. The method of claim 17, wherein transmitting the respective portions of the at least one restructured rendition to users includes, for each user,
identifying the respective portions of restructured media content based upon selection inputs provided by the user,
combining the identified respective portions into a new rendition, and
transmitting the new rendition to the user.

19. An apparatus comprising:
a first circuit configured and arranged to format different types of media content data having disparate formats and corresponding to respective sets of media content received from disparate content providers, into media content data in a common format type;
a second circuit configured and arranged to restructure portions of the media content data in the common format type into restructured renditions having an article-oriented structure defined by the common format type;
a third circuit configured and arranged to, for each set of media content, generate respective reformatted assets, each reformatted asset being specific to one of a plurality of disparate types of devices, based upon characteristics of the disparate device types;
a fourth circuit configured and arranged to generate device-indeterminate ID linking data that links respective portions of each rendition with portions of the media content data having disparate formats;
a fifth circuit configured and arranged to, for each of a plurality of users, provide access to information characterizing the renditions in the article-oriented structure, and collect user inputs pertaining to the information characterizing the renditions; and
a sixth circuit configured and arranged to transmit respective portions of the restructured renditions, along with assets corresponding to the respective portion being transmitted, to users at remote user interface circuits based on, for each user:
the collected user inputs,
media content access authorization data for the user,
the device-indeterminate ID linking data, and
characteristics of the remote user interface circuit via which the user accesses the media content.

20. The apparatus of claim 19, wherein the circuits include a plurality of communication ports connected by circuitry to one or more computer processors programmed to execute instructions that carry out one or more of the indicated operations, upon data received on one or more of the communication ports and upon data transmitted on one or more of the communication ports.

* * * * *